US009500817B2

(12) United States Patent
Coffey et al.

(10) Patent No.: US 9,500,817 B2
(45) Date of Patent: Nov. 22, 2016

(54) CONNECTORS AND ADAPTERS WITH AUTO-LATCHING FEATURES

(71) Applicants: ADC Telecommunications, Inc., Berwyn, PA (US); Tyco Electronics Corporation, Berwyn, PA (US)

(72) Inventors: Joseph C. Coffey, Burnsville, MN (US); Paul John Pepe, Clemmons, NC (US); Bernard Harold Hammond, Jr., Gloucestershire (GB)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/745,571

(22) Filed: Jun. 22, 2015

(65) Prior Publication Data

US 2015/0293311 A1 Oct. 15, 2015

Related U.S. Application Data

(62) Division of application No. 13/896,797, filed on May 17, 2013, now Pat. No. 9,063,298.

(60) Provisional application No. 61/648,976, filed on May 18, 2012, provisional application No. 61/670,460, filed on Jul. 11, 2012.

(51) Int. Cl.
*G02B 6/38* (2006.01)
*G02B 6/36* (2006.01)
*H01R 13/62* (2006.01)
(Continued)

(52) U.S. Cl.
CPC ............... *G02B 6/389* (2013.01); *G02B 6/36* (2013.01); *G02B 6/387* (2013.01); *G02B 6/3895* (2013.01); *H01R 13/6205* (2013.01); *H01R 13/627* (2013.01); *H01R 13/6275* (2013.01); *H01R 13/665* (2013.01); *G02B 6/3825* (2013.01);
(Continued)

(58) Field of Classification Search
CPC .... G02B 6/387; G02B 6/389; G02B 6/3893; G02B 6/3895; H01R 13/6205; H01R 13/665; H01R 13/627
USPC ................................................ 385/57, 75, 78
See application file for complete search history.

(56) References Cited

U.S. PATENT DOCUMENTS

| 2,735,991 A | 2/1956 | Simpson |
| 3,926,493 A | 12/1975 | Wakabayashi |

(Continued)

FOREIGN PATENT DOCUMENTS

| DE | 100 56 410 A1 | 5/2002 |
| JP | 2005-115324 | 4/2005 |

(Continued)

OTHER PUBLICATIONS

International Search Report and Written Opinion for PCT/US2013/041612 mailed Aug. 27, 2013.

(Continued)

*Primary Examiner* — Ryan Lepisto
(74) *Attorney, Agent, or Firm* — Merchant & Gould P.C.

(57) ABSTRACT

Fiber optic connectors and adapters may be automatically secured and released via a management system. Such automation may inhibit accidental and/or unauthorized insertion of fiber optic connectors into adapter ports. The automation also may inhibit accidental and/or unauthorized removal of the fiber optic connectors from the adapter ports.

19 Claims, 20 Drawing Sheets

(51) Int. Cl.
   *H01R 13/627* (2006.01)
   *H01R 13/66* (2006.01)
   *H04Q 1/02* (2006.01)

(52) U.S. Cl.
   CPC .......... *G02B 6/3893* (2013.01); *G02B 6/3898* (2013.01); *H04Q 1/136* (2013.01)

(56) References Cited

U.S. PATENT DOCUMENTS

| | | | |
|---|---|---|---|
| 5,297,968 | A | 3/1994 | Johnson et al. |
| 5,420,951 | A * | 5/1995 | Marazzi ............... G02B 6/3825 385/75 |
| 6,511,231 | B2 | 1/2003 | Lampert et al. |
| 6,821,024 | B2 * | 11/2004 | Bates, III ............. G02B 6/3893 385/76 |
| 6,966,788 | B1 | 11/2005 | Ruhl, Jr. |
| 7,128,471 | B2 | 10/2006 | Wilson |
| 7,226,217 | B1 | 6/2007 | Benton et al. |
| 7,229,220 | B2 | 6/2007 | Zhu et al. |
| 7,494,363 | B1 | 2/2009 | Wu |
| 7,553,179 | B2 | 6/2009 | Finona |
| 9,063,298 | B2 | 6/2015 | Coffey et al. |
| 2004/0010250 | A1 | 1/2004 | Manna et al. |
| 2004/0151464 | A1 | 8/2004 | Marrs |
| 2006/0093273 | A1 | 5/2006 | Fenwick et al. |
| 2008/0116678 | A1 | 5/2008 | Kirchner et al. |
| 2009/0269943 | A1 | 10/2009 | Palli et al. |
| 2010/0029117 | A1 | 2/2010 | Underwood et al. |
| 2010/0232756 | A1 * | 9/2010 | Hackett ................ G02B 6/3849 385/134 |
| 2010/0233889 | A1 | 9/2010 | Kiani et al. |
| 2011/0092100 | A1 * | 4/2011 | Coffey ................. H01R 13/641 439/620.22 |
| 2011/0222819 | A1 | 9/2011 | Anderson et al. |
| 2011/0235979 | A1 | 9/2011 | Anderson et al. |
| 2011/0255829 | A1 | 10/2011 | Anderson et al. |
| 2011/0262077 | A1 | 10/2011 | Anderson et al. |
| 2011/0317976 | A1 | 12/2011 | Eckstein et al. |
| 2012/0148195 | A1 | 6/2012 | Umeno |
| 2012/0155803 | A1 | 6/2012 | Benjamin et al. |
| 2014/0016902 | A1 | 1/2014 | Pepe et al. |

FOREIGN PATENT DOCUMENTS

| | | |
|---|---|---|
| WO | WO 2007/103689 A2 | 9/2007 |
| WO | WO 2009/006400 A1 | 1/2009 |

OTHER PUBLICATIONS

International Search Report and Written Opinion for PCT/US2013/049928 mailed Oct. 22, 2013.

European Search Report for Application No. 13790549.3 mailed Jan. 25, 2016.

New Zealand First Examination Report dated Sep. 15, 2015, 3 pages.

* cited by examiner

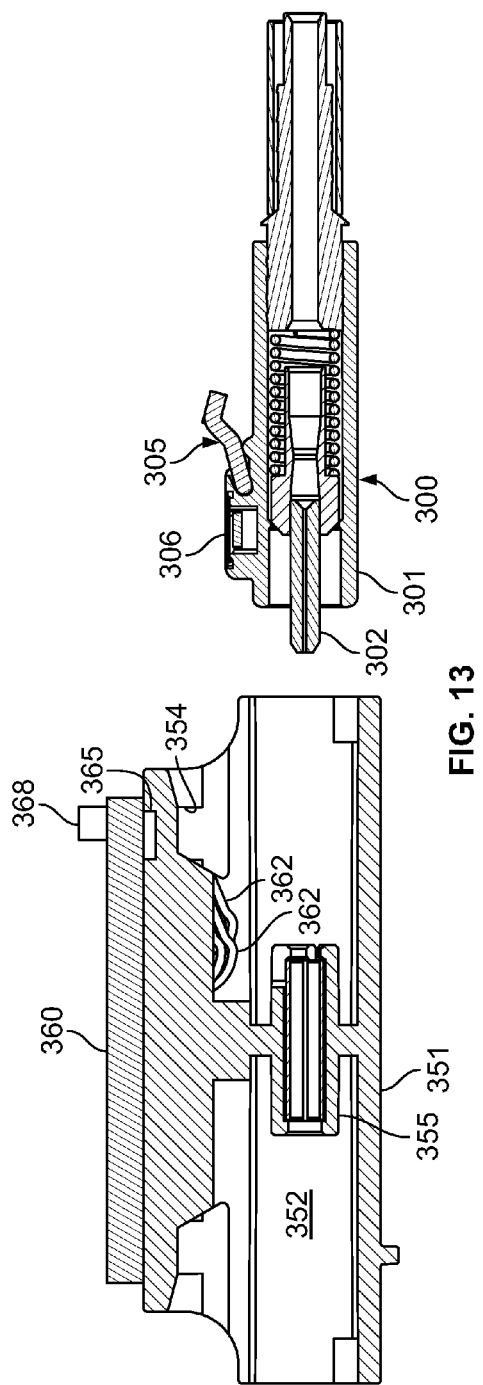
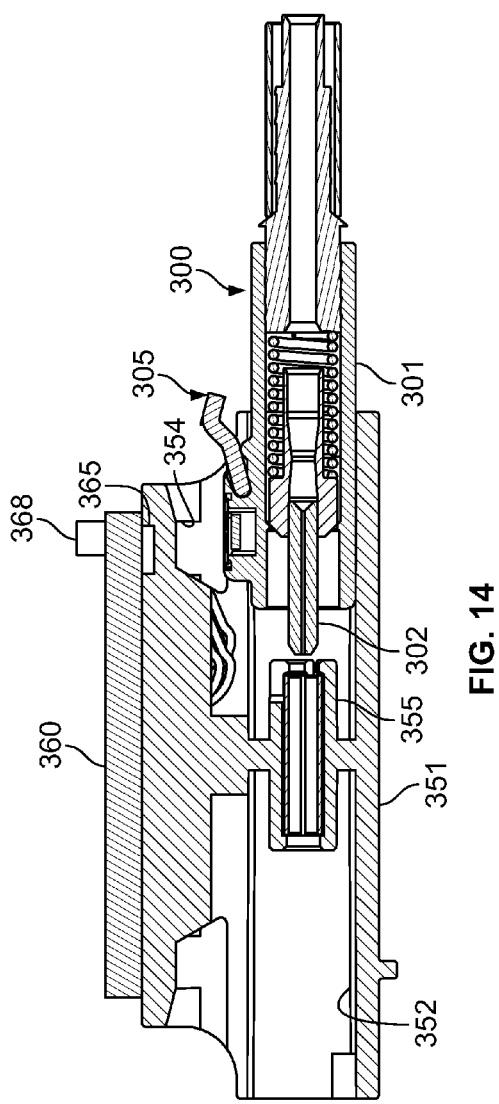
FIG. 13
FIG. 14

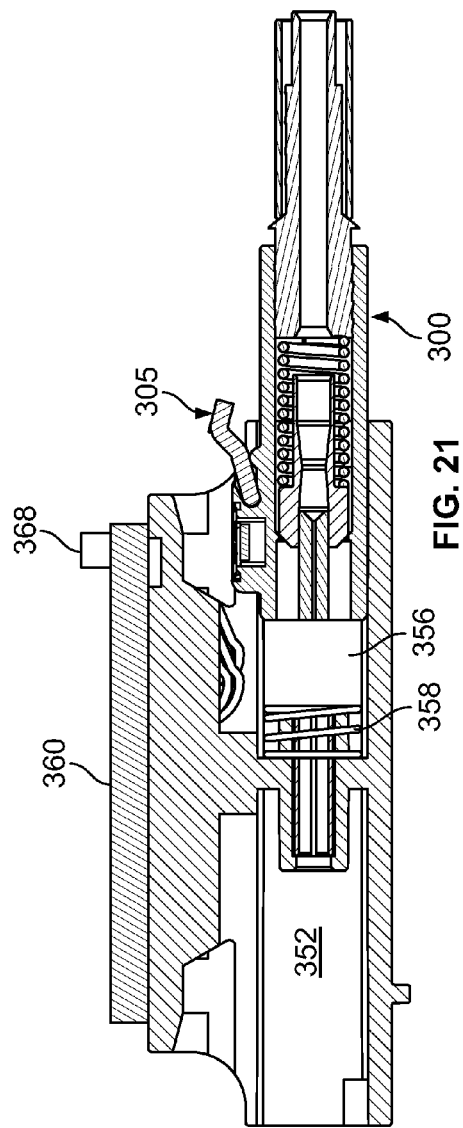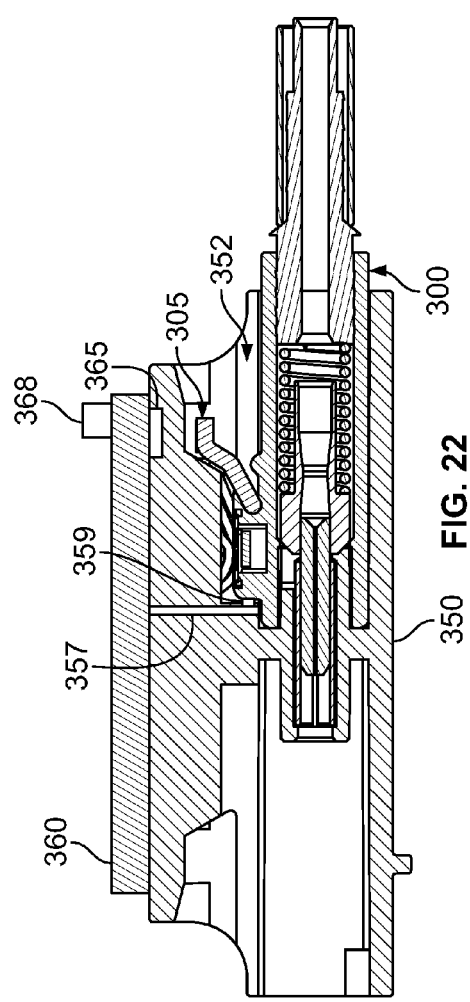

CONNECTORS AND ADAPTERS WITH AUTO-LATCHING FEATURES

CROSS-REFERENCE TO RELATED APPLICATIONS

This application is a divisional of application Ser. No. 13/896,797, filed May 17, 2013, now U.S. Pat. No. 9,063,298, which application claims the benefit of provisional application Ser. No. 61/648,976, filed May 18, 2012 and Ser. No. 61/670,460, filed Jul. 11, 2012, which applications are incorporated herein by reference in their entireties.

BACKGROUND

In communications infrastructure installations, a variety of communications devices can be used for switching, cross-connecting, and interconnecting communications signal transmission paths in a communications network. Some such communications devices are installed in one or more equipment racks to permit organized, high-density installations to be achieved in limited space available for equipment. Some connections are made between plug connectors (e.g., optical plug connectors, electrical plug connectors, etc.) and adapters (e.g., optical adapters, electrical jacks, etc.) within the communications network.

FIG. 23 is a cross-sectional view of one example optical adapter 450 defining front and rear ports 452 receiving first and second optical plug connectors 400A, 400B, respectively. Each optical plug connector 400A, 400B includes a manually actuated latch finger 405 that extends rearwardly so that a distal end of the latch finger 405 is located at a first distance L" away from the front of the connector 400. The first distance L" is sufficiently long that at least the distal end of the latch finger 405 extends outwardly from the optical adapter 450 when the connector 400 is fully inserted within the adapter 450. Accordingly, the distal end of the latch finger 405 is accessible to a user when the connector 400 is fully inserted within the adapter 450.

The latch finger 405 defines latching surfaces that engage abutment surfaces within the ports 452. When a connector 400 is inserted into one of the adapter ports 452, the latch finger 405 may be flexed towards a body of the connector 400 (e.g., by a finger of the user or by the adapter body as the user applies an insertion force to the connector 400) to allow the latching surfaces to pass the abutment surfaces. Once inserted, the latch finger 405 flexes back to align the latching surfaces and the abutment surfaces, thereby securing the connector 400 to the adapter 450. To remove the connector 400, the latch finger 405 is depressed by a user (e.g., using a finger of the user) to move the latching surface out of engagement with the abutment surface. When the latching surface is clear of the abutment surface, the user may pull the connector 400 out of the adapter port 452.

Manually actuated latch fingers can be actuated accidentally by a user (e.g., when routing cables past a dense group of ports; when actuating an adjacent latch finger; etc.). Improvements in connection of fiber optic connectors are desired.

SUMMARY

Aspects of the present disclosure relate to a plug connector (e.g., a fiber optic connector, an electrical connector, etc.) including a plug body; and a latching arrangement including a latch arm pivotally coupled to the plug body. The latch arm is pivotal between a raised position and a lowered position. The latch arm is configured to be in the lowered position absent an external force. In certain implementations, the latch arm is at least partially formed from or coated with a material that is temporarily magnetizable.

Other aspects of the present disclosure relate to an adapter arrangement (e.g., an optical adapter, an electrical jack, etc.) for receiving the plug connector. The adapter arrangement includes an adapter body defining a port and a magnet arrangement coupled to the adapter body. The magnet arrangement includes at least one permanent magnet and at least one electromagnet. The permanent magnet constantly generates a magnetic field within a region of the port. The electromagnet is configured to selectively generate a magnetic field within the port. The electromagnet is stronger than the permanent magnet.

Other aspects of the present disclosure relate to a managed connectivity system including at least one adapter defining a plurality of ports having magnet arrangements; a plug connector including a magnetizable latching arm that is sufficiently short to not extend outside of the adapter when the plug connector is mounted within one of the ports of the adapter; and a management system including a processor that is configured to operate the magnet arrangements. The latching arm is moveable between a lowered position and a raised position. The latching arm is sized to pass by the abutment surface when in the lowered position during insertion or removal of the plug connector. The latching arm is sized to engage the abutment surface when the in the raised position during insertion or removal of the plug connector.

Other aspects of the present disclosure relate to a method of authorizing insertion of a plug connector (e.g., an optical plug connector, an electrical plug connector, etc.) into an adapter including determining that a plug connector has been inserted into the port of the adapter; determining that insertion of the plug connector is authorized at the port; and actuating an electromagnet to generate a magnetic field that is sufficiently powerful to lift a latch arm of the plug connector to a raised position. The plug connector is not secured to the adapter until the electromagnet is actuated.

Other aspects of the present disclosure relate to a method of authorizing removal a plug connector from an optical adapter. The plug connector has a latch arm that is retained in a raised position by a magnetic field having a first polarity. The method includes receiving a port selection identifying a port of an adapter from which removal of the plug connector is desired; receiving a readiness indication from a user; actuating a magnet arrangement; and indicating to the user that the plug connector is unlatched and ready for removal. Actuating the magnet arrangement generates a magnetic field having a second polarity that is opposite the first polarity that moves the latch arm of the plug connector to a lowered position.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 13 is a cross-sectional view taken along a plug insertion axis of the optical adapter of FIG. 12 and a connector having one of the latching arrangements disclosed herein aligned for insertion into one of the ports of the optical adapter;

FIG. 14 shows the connector of FIG. 13 partially inserted within the optical connector;

FIG. 21 is a cross-sectional view taken along a plug insertion axis of an optical adapter including an ejector for pushing a connector out of the adapter port;

FIG. 22 is a cross-sectional view taken along a plug insertion axis of an optical adapter including an internal micro-switch by which a user may indicate readiness to remove a connector by pushing the connector further into the adapter port;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

In general, the present disclosure relates to plug connectors and adapters that may be automatically secured and released via a management system. Such automation may inhibit accidental and/or unauthorized insertion of plug connectors into adapter ports. The automation also may inhibit accidental and/or unauthorized removal of the plug connectors from the ports.

In some implementations, the plug connectors are optical plug connectors (e.g., LC-type connectors, MPO-type connectors, SC-type connectors, LX.5-type connectors, etc.). In other implementations, the plug connectors are electrical plug connectors (e.g., RJ45-type plugs, RJpoint5-type plugs, etc.). For convenience, the remainder of this disclosure will discuss these concepts of this disclosure in terms of LC-type plug connectors and optical adapters. It will be understood by one skilled in the art that the concepts disclosed herein may be applied to other types of plug connectors (e.g., MPO-type connectors, RJ45-type connectors, etc.) without deviating from the scope of the disclosure.

Figure 1:
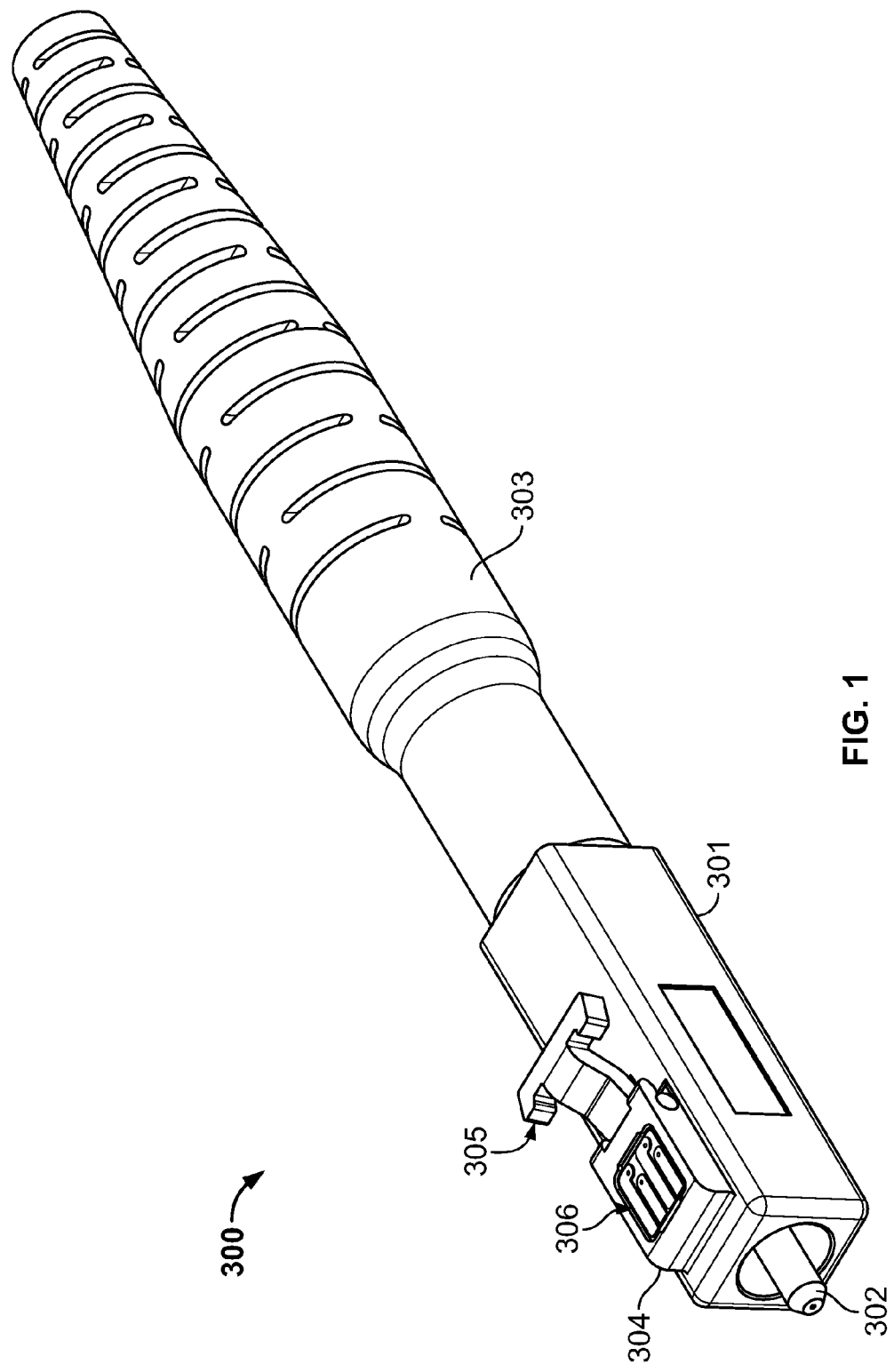
FIG. 1 is a front perspective view of an example fiber optic connector including a latching arrangement having features that are examples of inventive aspects in accordance with the principles of the present disclosure.
Figure 2:
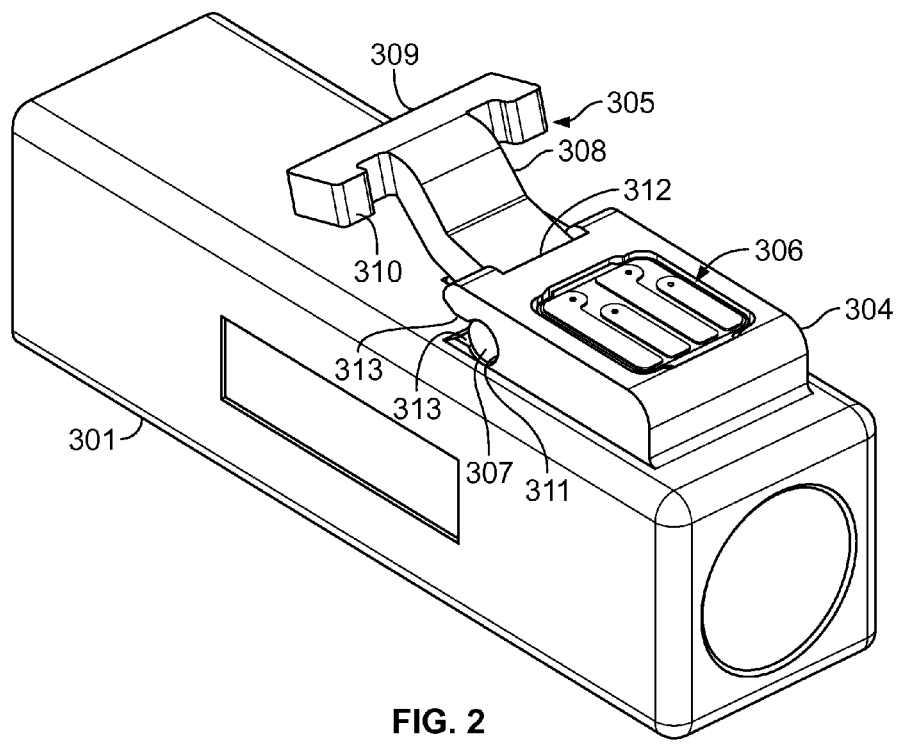
FIG. 2 is an enlarged, front perspective view of a plug nose portion of the connector of FIG. 1 shown with the latching arrangement in a lowered position.
Figure 3:
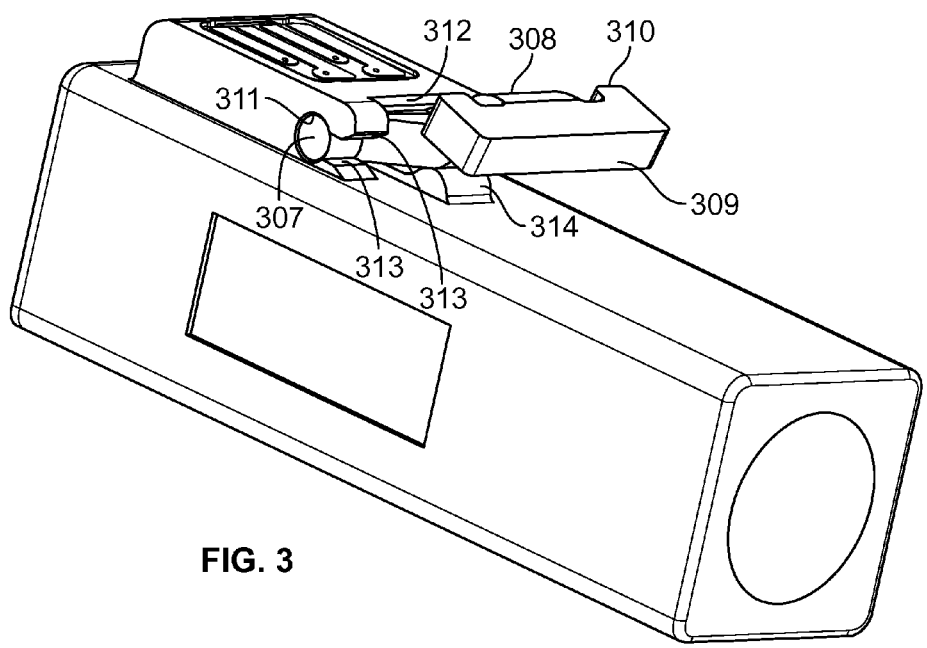
FIG. 3 is a rear perspective view of the plug nose portion of FIG. 2.

FIG. 1 illustrates an example optical fiber connector 300 including a connector body 301 coupled to a ferrule 302 that is configured to hold at least one optical fiber. A boot 303 extends rearwardly from the connector body 301 to support and protect the optical fiber terminated by the connector 300. The connector body 301 includes a key area 304 that protrudes upwardly from the connector body 301. The key area 304 is configured to align with a notched area of an optical adapter port 352 (see FIG. 12) when the connector 300 is inserted into the optical adapter 350.

The example connector 300 includes a latching member 305 that is configured to pivot about a pivot axis P (FIG. 7) between a raised position and a lowered position as will be discussed in more detail herein. In some implementations, the connector 300 includes a storage device 306 that is configured to electronically store information pertaining to the connector 300 (e.g., physical layer information). In certain implementations, the storage device 306 is mounted to the key area 304 of the connector 300. In other implementations, the connector 300 does not include memory for electronically storing information.

Figure 6:
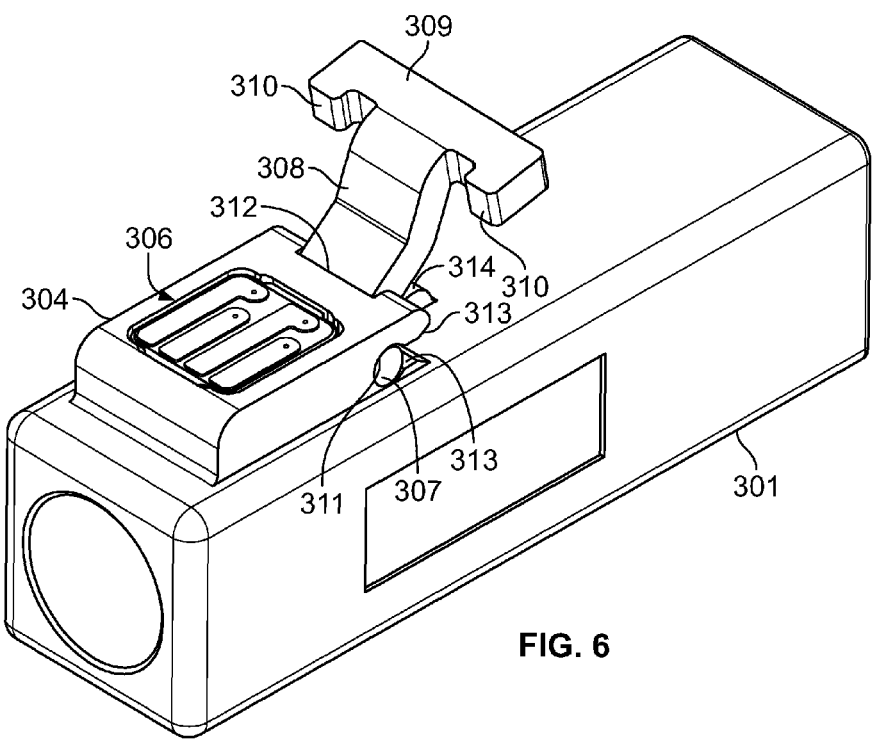
FIG. 6 is an enlarged, front perspective view of a plug nose portion of the connector of FIG. 1 shown with the latching arrangement in a raised position.
Figure 7:
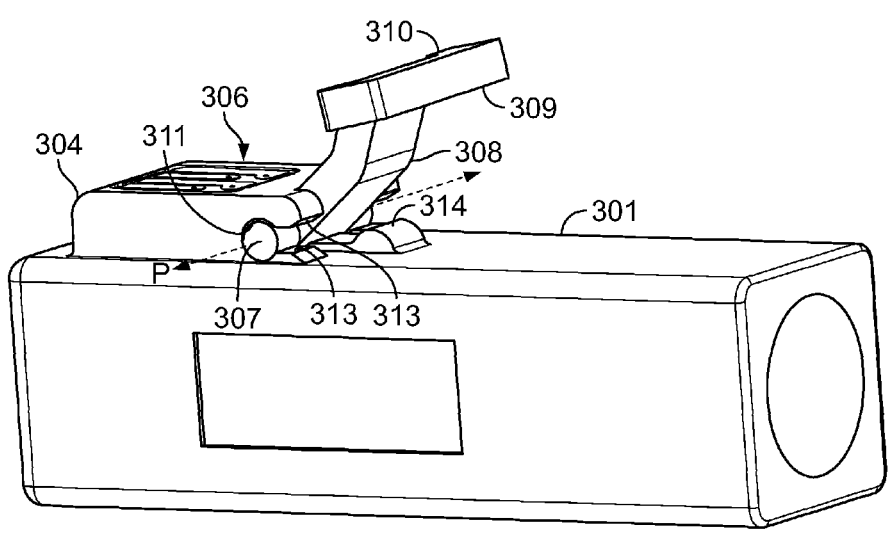
FIG. 7 is a rear perspective view of the plug nose portion of FIG. 6.
Figure 8:
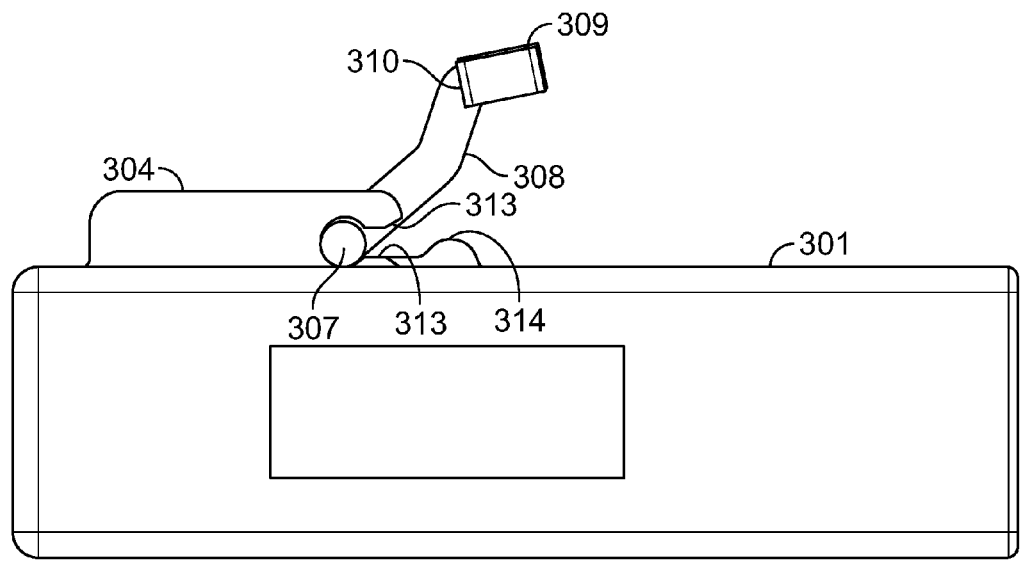
FIG. 8 is a side elevational view of the plug nose portion of FIG. 6.

FIGS. 2-8 illustrate one example latching member 305 suitable for use with the connector body 301. FIGS. 2-5 show the latching member 305 in the lowered position relative to the connector body 301 and FIGS. 6-8 show the latching member 305 in the raised position. When in the lowered position, the latching member 305 enables the connector 300 to be freely inserted and removed from an optical adapter port. When in the raised position, the latching member 305 secures the connector 300 within an optical adapter port as will be disclosed in more detail herein.

The latching member 305 includes a pivot pin 307 that pivotally couples to the connector body 301. In some implementations, the pivot pin 307 is mounted within a recess 311 defined in the key area 304 of the connector body 301. The pivot pin 307 is elongated along the pivot axis P and rotatable within the recess 311. In the example shown, the pivot pin 307 is snap-fit between latching fingers 313 defined at a rear side of the key area 304. In other implementations, the pivot pin 307 may be otherwise pivotally or rotatably coupled to the connector body 301.

An arm 308 extends from the pivot pin 307 to a handle 309. In the example shown, the arm 308 is bent or curved. In other implementations, the arm 308 may define a planar surface. In certain implementations, the handle 309 extends transverse to the arm 308 to form a T-shape. In some implementations, the handle 309 defines protrusions 310 that extend forwardly of the handle 309 towards the key region 304 at opposite sides of the handle 309. In other implementations, the handle 309 has a generally rectangular shape.

Figure 4:
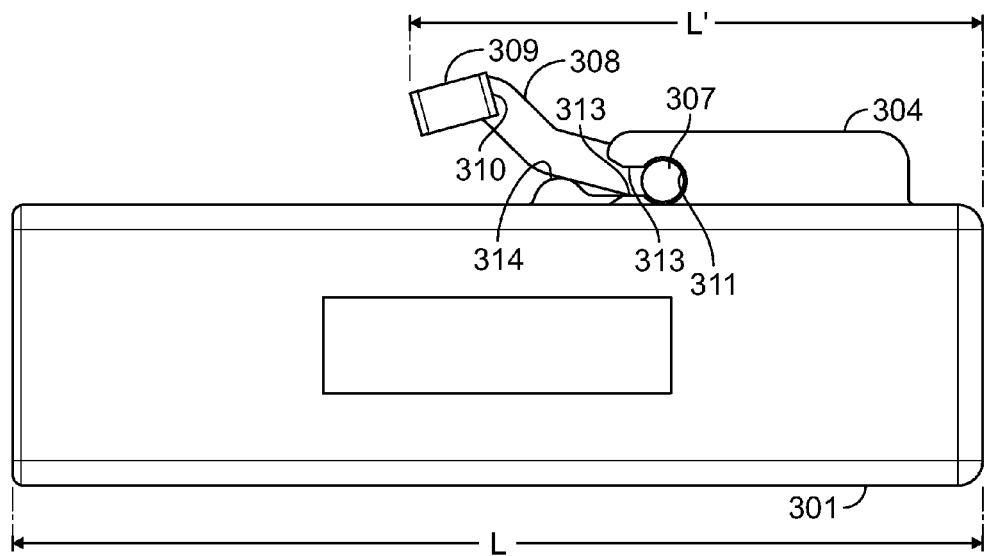
FIG. 4 is a side elevational view of the plug nose portion of FIG. 2.
Figure 5:
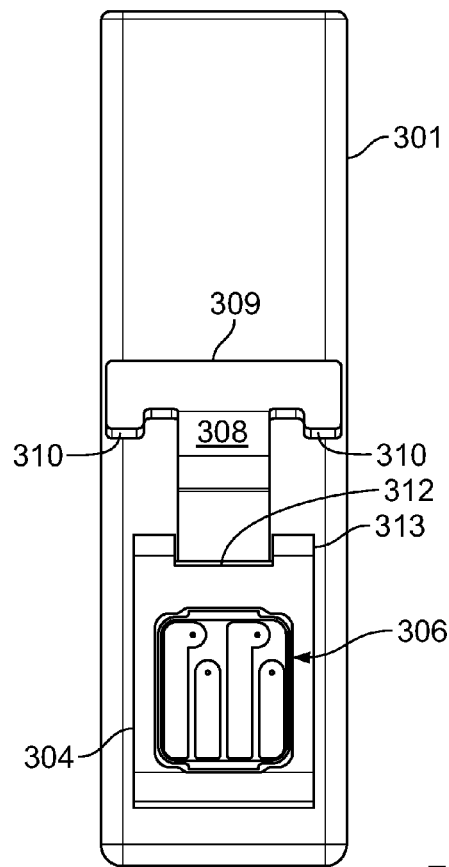
FIG. 5 is a top plan view of the plug nose portion of FIG. 2.

In general, the latching member 305 extends rearwardly so that a distal end of the latch finger 405 is located at a second distance L' away from the front of the connector 300 (see FIG. 4). The second distance L' is less than the first distance L" of the conventional LC-type connector shown in FIG. 23. The arm 308 is sufficiently short so that the distal end of the latching member 305 is fully contained within an adapter port 352 when the connector 300 is inserted within the adapter port 352 (see FIG. 15).

Figure 9:
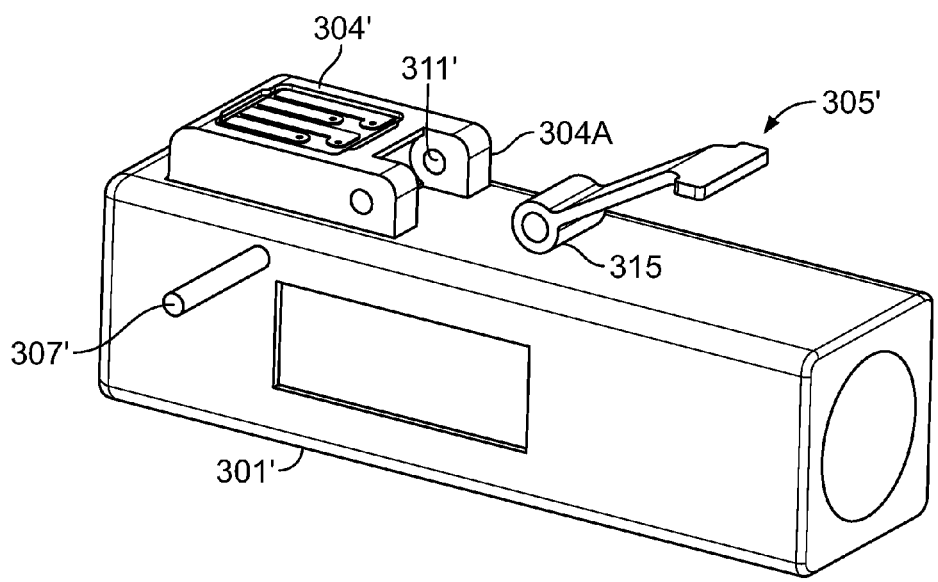
FIG. 9 is a rear perspective view of another example plug nose having another example latching arrangement exploded outwardly from the plug nose.
Figure 10:
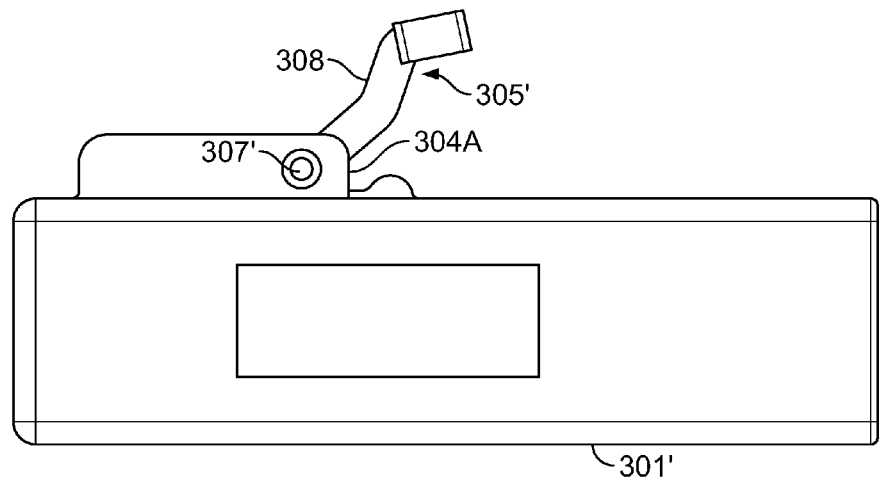
FIG. 10 is a side elevational view of the plug nose portion of FIG. 9 with the latching arrangement assembled and in a raised position.

FIGS. 9 and 10 show an alternative implementation of a connector body 301' and a latching member 305'. The connector body 301' includes two spaced apart support mounts 304A extending from a rear side of a key area 304'. Each of the support mounts 304A defines an opening 311' through which a pivot pin 307' may be inserted. The pivot pin 307' may be snap-fit, welded, heat-sealed, or otherwise secured within the openings 311'. In certain implementations, the pivot pin 307' is rotationally fixed within the openings 311'.

An example latching member 305' includes a pin-receiving portion 315 that defines a channel sized and shaped to receive the pivot pin 307'. The pin-receiving portion 315 is configured to rotate around the pivot pin 307' (see FIG. 10) to enable the latching member 305' to pivot between the raised and lowered positions. In the example shown, the pin-receiving portion includes a hollow cylinder. The arm 308 extends from the pin-receiving portion 315 similar to how the arm 308 extends from the pivot pin 307 of latching member 305.

Figure 11:
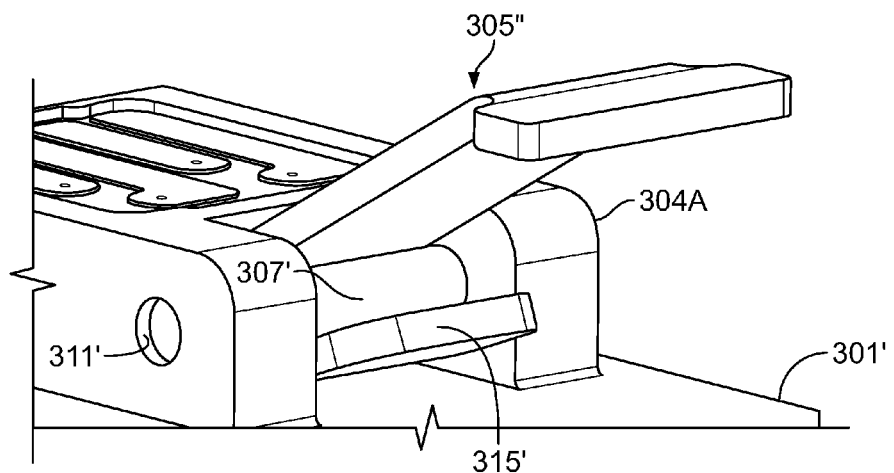
FIG. 11 is an enlarged view of a portion of another plug nose portion having another latching arrangement in the raised position.

FIG. 11 illustrates yet another alternative implementation of a latching member 305" suitable for mounting on the connector body 301' of FIGS. 9 and 10. The latching member 305" is substantially similar to the latching member 305' of FIGS. 9 and 10, except that a pin-receiving portion 315' includes a bent or folded section of the arm 308. The pin-receiving portion 315' is configured to rotate about the pivot pin 307'. However, the pin-receiving portion 315' does not fully enclose the pivot pin 307'.

In some implementations, any of the connector bodies 301, 301' shown above may include a bump 314 or other support structure that maintains the handle 309 of the latching member 305, 305', 305" at a first distance away from the connector body 301, 301' when the latching member 305 is in the lowered position. One example bump 314 is shown on connector body 301 in FIGS. 3, 4, 7, and 8. Of course, such a bump 314 may be added to any of the connector bodies disclosed herein. In certain implementations, the arm 308 of the latching member 305, 305', 305" may seat on the bump 314 when the latching member 305, 305', 305" is in the lowered position. When in the raised position, the latching member 305, 305', 305" does not seat on the bump 314 (see FIG. 7).

At least a portion of the latching member 305, 305', 305" is formed from a magnetizable material (e.g., a metal). In some implementations, the handle 309 is formed of a magnetizable material. In certain implementations, the arm 308 is formed of a magnetizable material. In certain implementations, the arm 308 is not formed of a magnetizable material. In other implementations, the entire latching member 305, 305', 305" is formed of a magnetizable material.

The following disclosure addresses how the connector 300 disclosed above may be inserted into and removed from an optical adapter 350. For convenience, the remainder of the disclosure will refer only to the connector body 301 and latching member 305. It should be understood, however, that the principles discussed below apply to all of the implementations discussed above. Accordingly, in the below disclosure, the connector body 301' may be substituted for the connector body 301 and either of the latching members 305', 305" may be substituted for the latching member 305.

Figure 12:
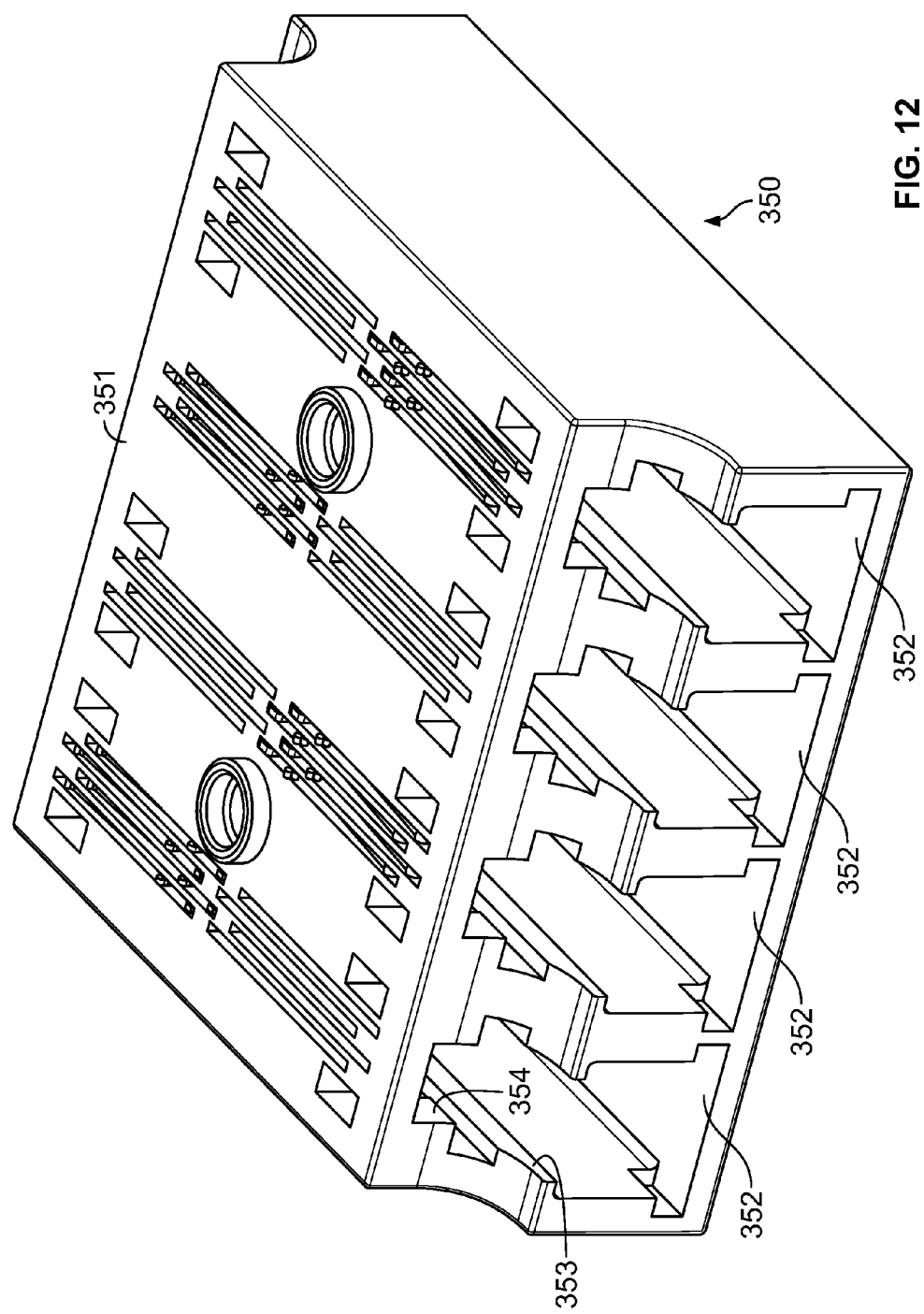
FIG. 12 is a front perspective view of an optical adapter defining ports for receiving a fiber optic connector.

FIG. 12 illustrates an example optical adapter 350 configured to receive and align two or more optical connectors 300. The optical adapter 350 includes an adapter housing 351 defining two or more ports 352. In the example shown, the optical adapter 350 is a quadruplex adapter that defines four ports 352 at a front side and four ports 352 at a rear side. In other implementations, however, the adapter 350 may include a greater or lesser number of ports 352 on each side. Each port 352 defines a notched region 353 sized and shaped to receive the key area 304, 304' of an optical connector 300.

Figure 15:
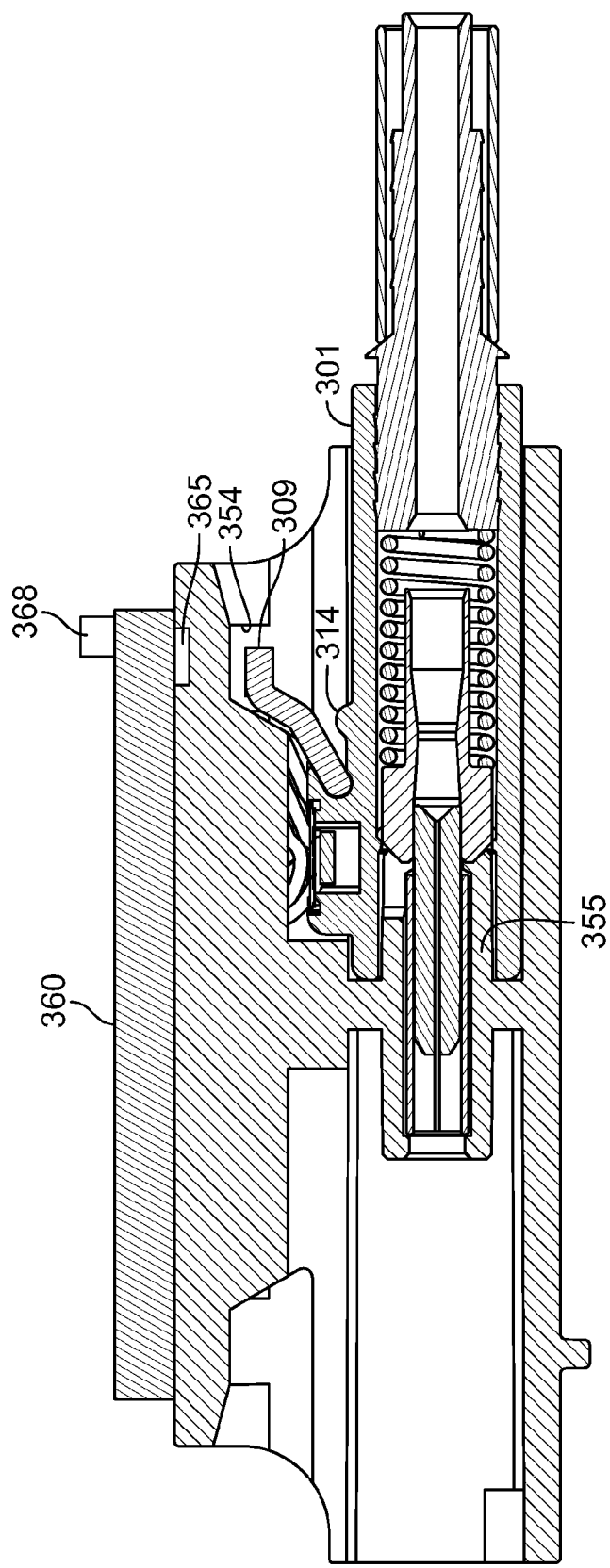
FIG. 15 shows the connector of FIG. 13 fully inserted within the optical connector and the latching arrangement in the raised position.

As shown in FIGS. 13-15, the adapter housing 351 includes a ferrule holder 355 between each set of front and rear ports 352. In the example shown, the ferrule holder 355 includes a splice sleeve that is configured to receive and align a ferrule of an optical connector 300 at each end of the ferrule holder 355. The adapter housing 351 also includes an abutment surface 354 that faces an interior of the adapter housing 351. The abutment surface 354 is sized so that the latching member of the connector 300 may freely pass by the abutment surface 354 when the latching member is lowered. When the latching member is raised, the distal end of the latching member engages the abutment surfaces 354 of the adapter housing 351 (see FIG. 15).

Figure 16:
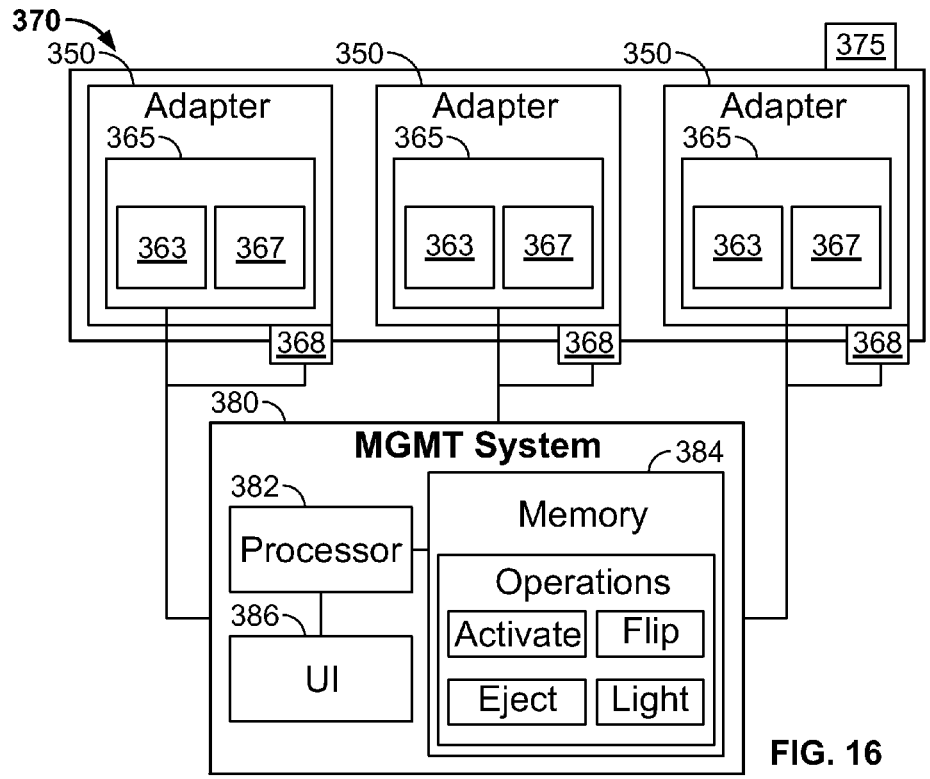
FIG. 16 is a schematic block diagram of an example management system that is operationally coupled to equipment including one or more optical adapters that are configured in accordance with the principles of the present disclosure.

A magnet arrangement 365 is coupled to the adapter housing 351 at the port 352 to interact with the latching member 305 of the connector 300 when the connector 300 is inserted at the adapter housing 351. In some implementations, the magnet arrangement 365 includes at least one permanent magnet 363 and at least one electromagnet 367 (FIG. 16). As the term is used herein, a permanent magnet 363 is a structure that continuously generates a magnetic field. As the term is used herein, an electromagnet 367 is a structure (e.g., a coil of wire) that generates a magnetic field when an electric current is applied and does not generate a magnetic field when an electric current is not applied. The polarization of the magnetic field generating by the electromagnet 367 can be selectively reversed.

The permanent magnet 363 is sufficiently weak that the magnetic field generated by the permanent magnet is insufficient to attract the magnetizable material of the latching member 305 towards the permanent magnet 363 when the latching member 305 is in the lowered position. The permanent magnet 363 is sufficiently strong that the magnetic field generated by the permanent magnet is sufficient to attract the magnetizable material of the latching member 305 when the latching member 305 is in the raised position. The electromagnet 367 is sufficiently strong that the magnetic field generated by the activated electromagnet is sufficient to attract the magnetizable material of the latching member 305 when the latching member 305 is in the lowered position.

The magnet arrangement 365 is disposed within the adapter port 352 so that the permanent magnet 363 is aligned with a portion of the latching member 305 when the connector 300 is fully inserted within the adapter port 352. In certain implementations, the permanent magnet 365 is disposed to align with one of the protrusions 310 extending forwardly from the handle 309 of the latching member 305. In certain implementations, the magnet arrangement 365 includes two permanent magnets 363 and one electromagnet 367. In one example implementation, each permanent magnet 363 aligns with one of the protrusions 310 of the handle 309. In other implementations, the magnet arrangement 365 may include any desired number of permanent and electromagnets.

Figure 24:
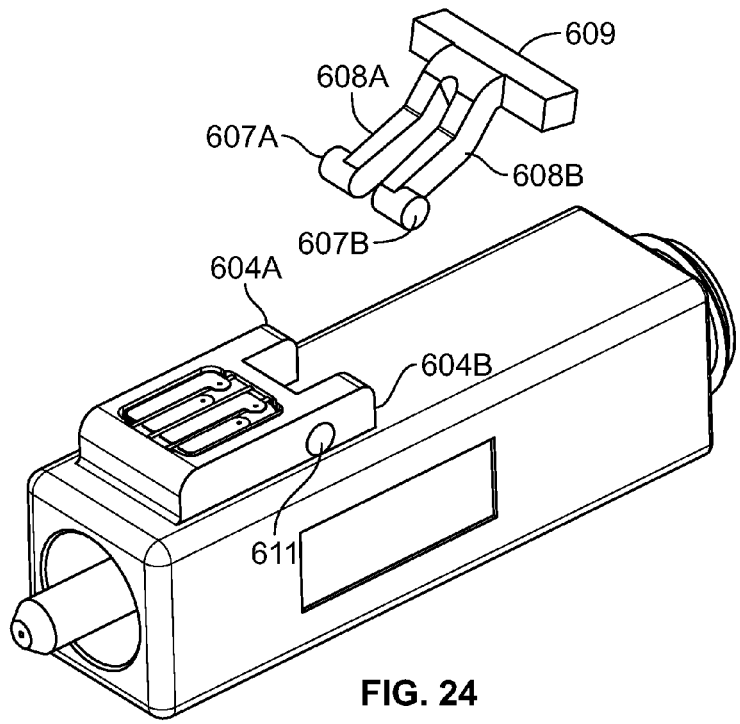
FIG. 24 is a front perspective view of a connector body with another example implementation of a latching member exploded outwardly from the connector body.
Figure 25:
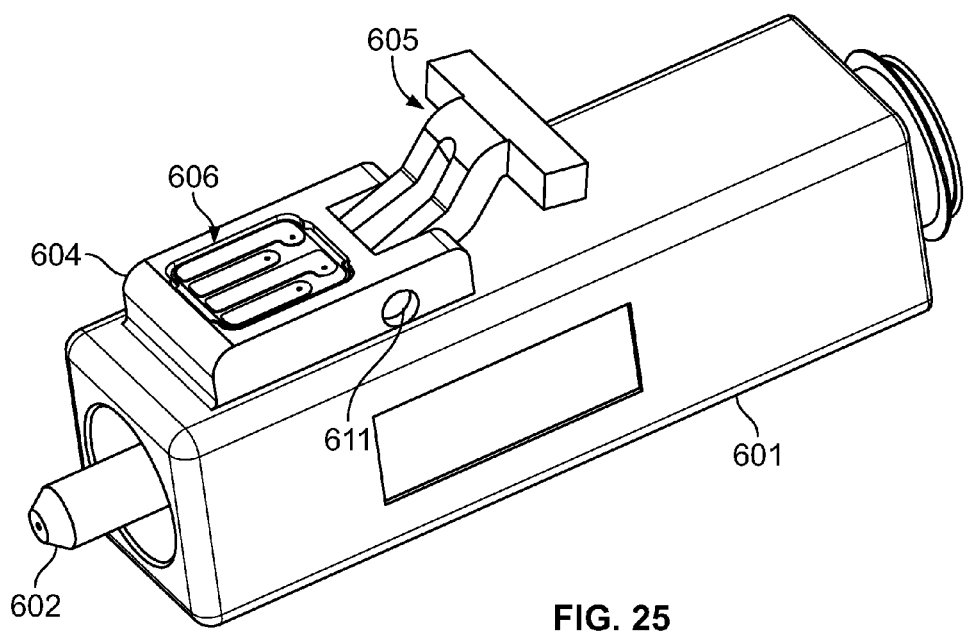
FIG. 25 shows the latching member of FIG. 24 assembled on the connector body.
Figure 26:
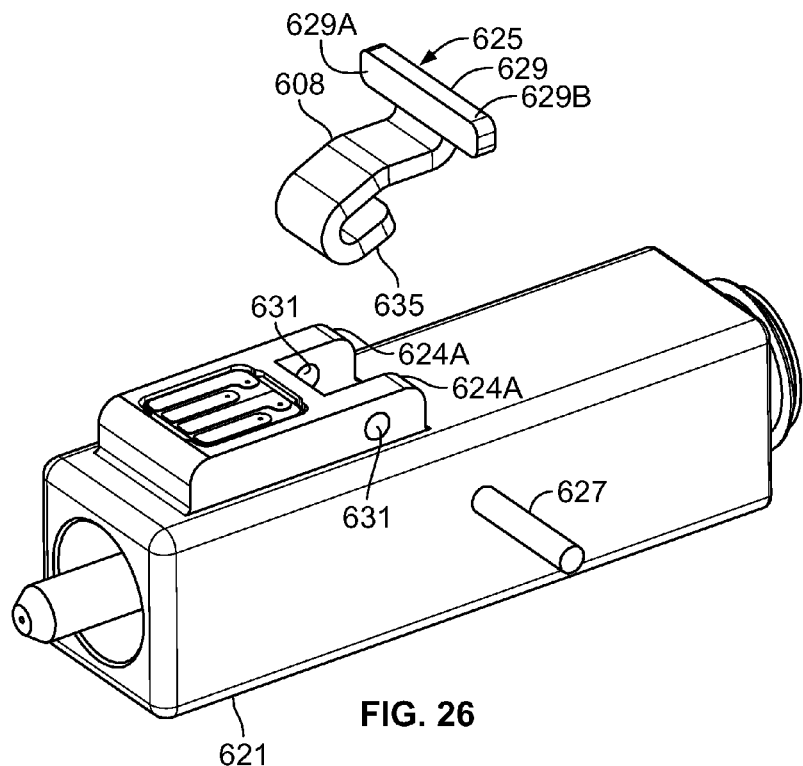
FIG. 26 is a front perspective view of a connector body with another example implementation of a latching member exploded outwardly from the connector body.
Figure 27:
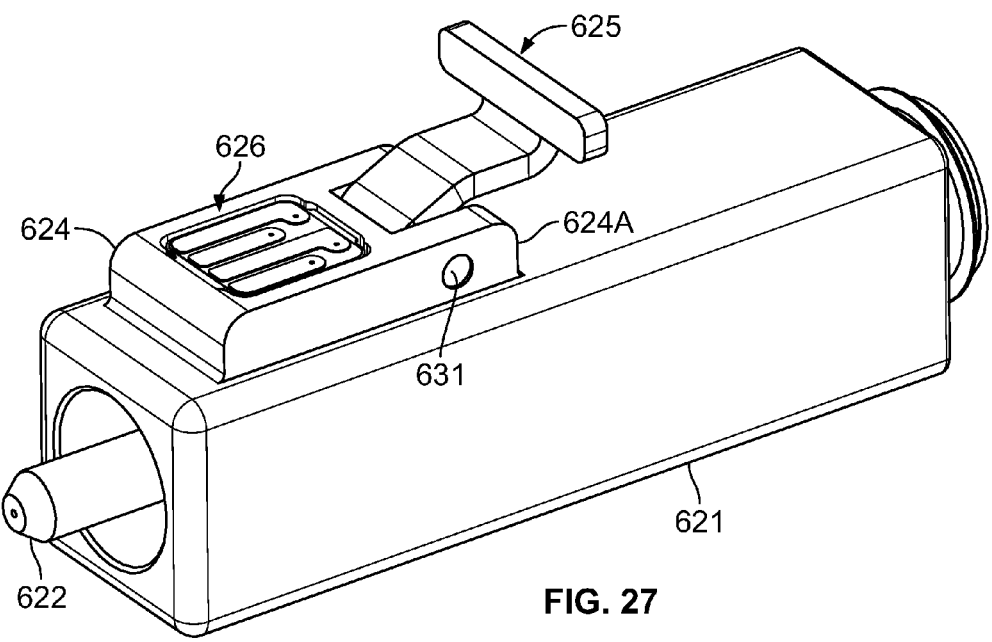
FIG. 27 shows the latching member of FIG. 26 assembled on the connector body.

FIGS. 24-33 illustrate additional example implementations of a connector body and a latching member. For example, FIGS. 24 and 25 illustrate a connector body 601 and a latching member 605 that pivots between a raised position and a lowered position. The connector body 601 holds a ferrule 602. In certain implementations, a storage device 606 is disposed at a key 604 defined by the body 601. In other implementations, the storage device 606 may be disposed elsewhere on the body 601. In still other implementations, the connector body 601 may not have a storage device mounted thereon.

The latching member 605 is configured to be mounted to the connector body 601. For example, the latching member 605 includes a first pivot pin 607A and a second pivot pin 607B that extend away from each other. Each pivot pin 607A, 607B is sized to be mounted at one of the two spaced-apart support mounts 604A, 604B extending from a rear side of the key 604. In the example shown, each pivot pin 607A, 607B fits within an opening 611 defined in the respective support mount 604A, 604B. The pivot pins 607A, 607B may be snap-fit, welded, heat-sealed, or otherwise secured within the openings 611.

Two spaced-apart arms 608A, 608B extends from the pivot pins 607A, 607B to a handle 609. In the example shown, the arms 608A, 608B are bent or curved. In other implementations, the arm 608A, 608B may define a planar surface. In certain implementations, the handle 609 extends transverse to the arm 608 to form a T-shape. In some implementations, the handle 609 has a generally rectangular shape. In other implementations, the handle 609 has protrusions that extend forwardly of the handle 609 towards the key region 604.

Figure 23:
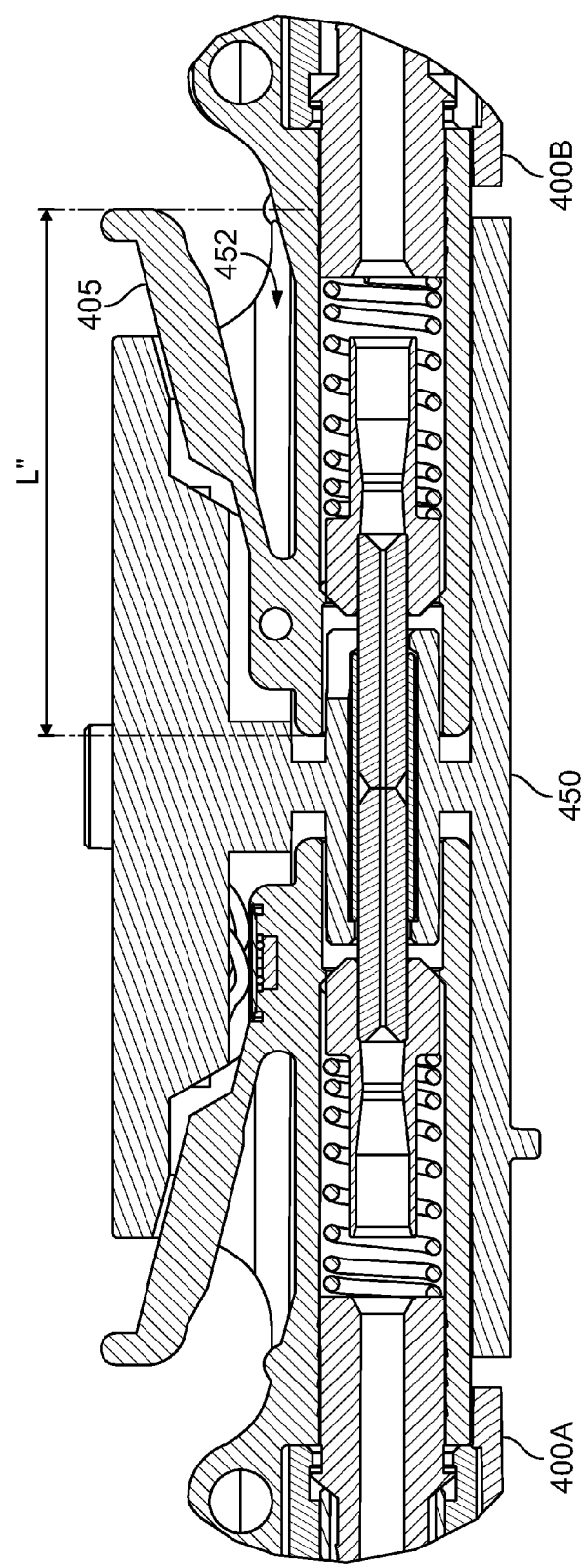
FIG. 23 illustrates an adapter receiving connectors having manually operated latching arrangements that protrude from the adapter ports.

In general, the latching member 605 extends rearwardly so that a distal end of the latching member 605 is located closer to the front of the connector body 601 than the distal end of the latching member of the conventional LC-type connector shown in FIG. 23. The arms 608A, 608B are sufficiently short so that the distal end of the latching member 605 is fully contained within an adapter port 352 when the connector body 601 is inserted within the adapter port 352.

FIGS. 26-29 illustrate another alternative implementation of a connector body 621 having a latching member 625 that pivots between a raised position and a lowered position. The connector body 621 holds a ferrule 622 and defines a key region 624. Support mounts 624A extend rearwardly from the key region 624 and define laterally aligned openings 631 for receiving a pivot pin 627 that extends between the openings 631. In certain implementations, the pin 627 is rotationally fixed (e.g., welded, glued, etc.) to the support mounts 624A. In other implementations, the pin 627 is rotatable (e.g., snap-fit) within the openings 631.

The latching member 625 includes an arm 628 extending from a handle 629 to a pin-receiving portion 635. The pin-receiving portion 635 is shaped to wrap or fold partially around the pivot pin 627. The pin-receiving portion 635 is configured to rotate about the pivot pin 627. However, the pin-receiving portion 615 does not fully enclose the pivot pin 627. In certain implementations, part of the arm 628 extends parallel with part of the pin-receiving portion 635. In the example shown, the arm 628 is bent or curved between the handle 629 to the pin-receiving portion 635. In some implementations, the handle 629 has a major surface 629A that extends upwardly form the arm 628 so that an edge 629B of the handle 629 faces away from the connector body 621.

Figure 28:
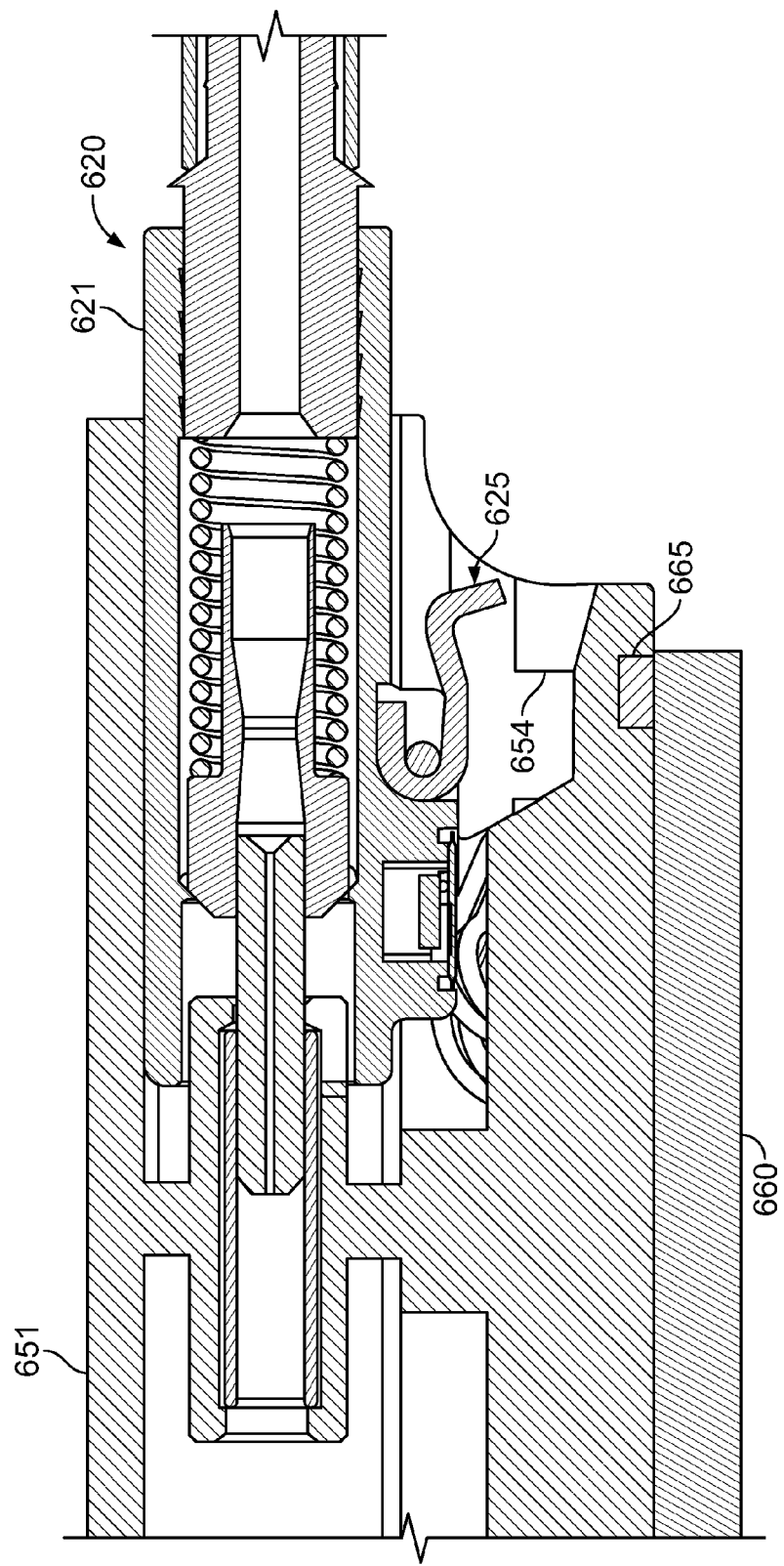
FIG. 28 is a cross-sectional view of an adapter at which the connector body and latching member of FIG. 27 is inserted with the latching member disposed in the lowered position.
Figure 29:
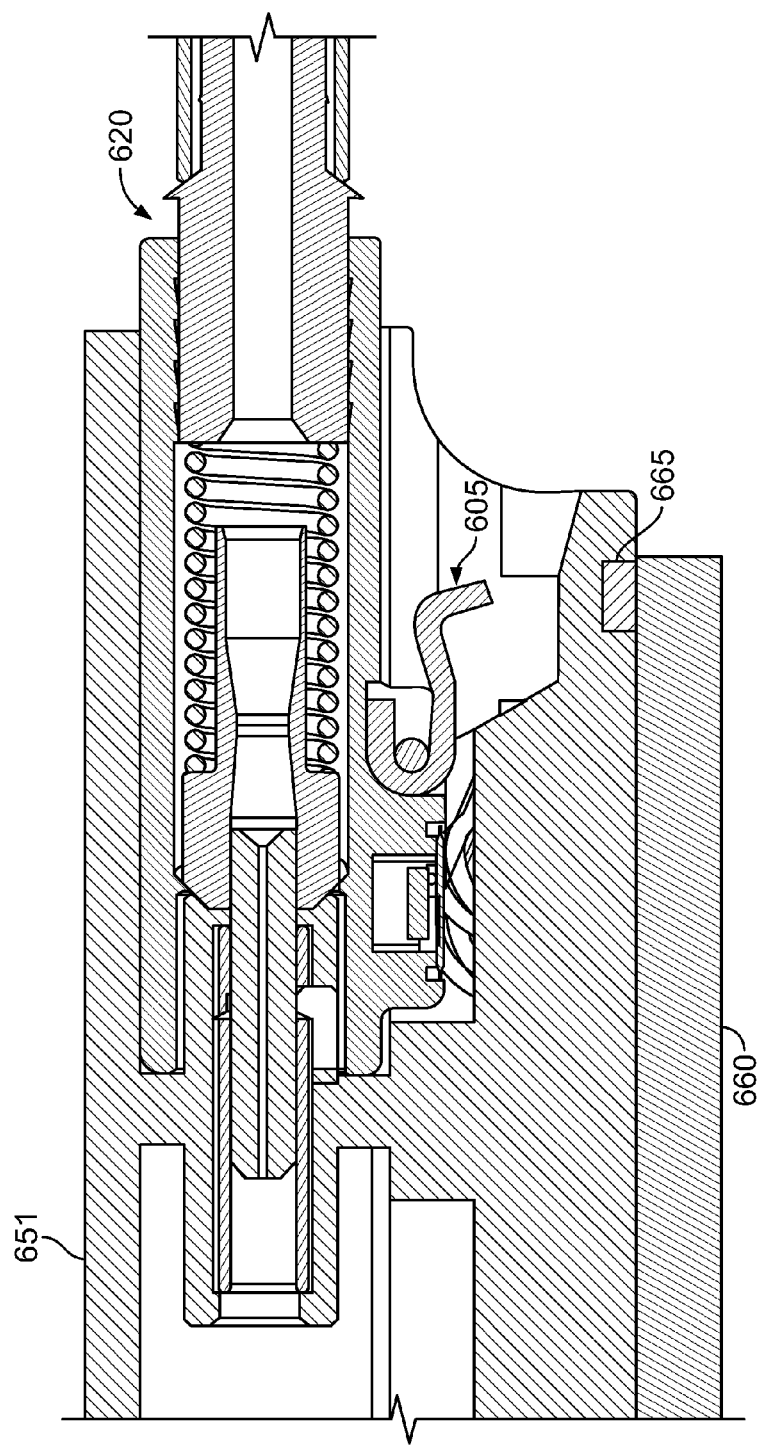
FIG. 29 shows the adapter and connector of FIG. 28 with the latching member disposed in the raised position.
Figure 30:
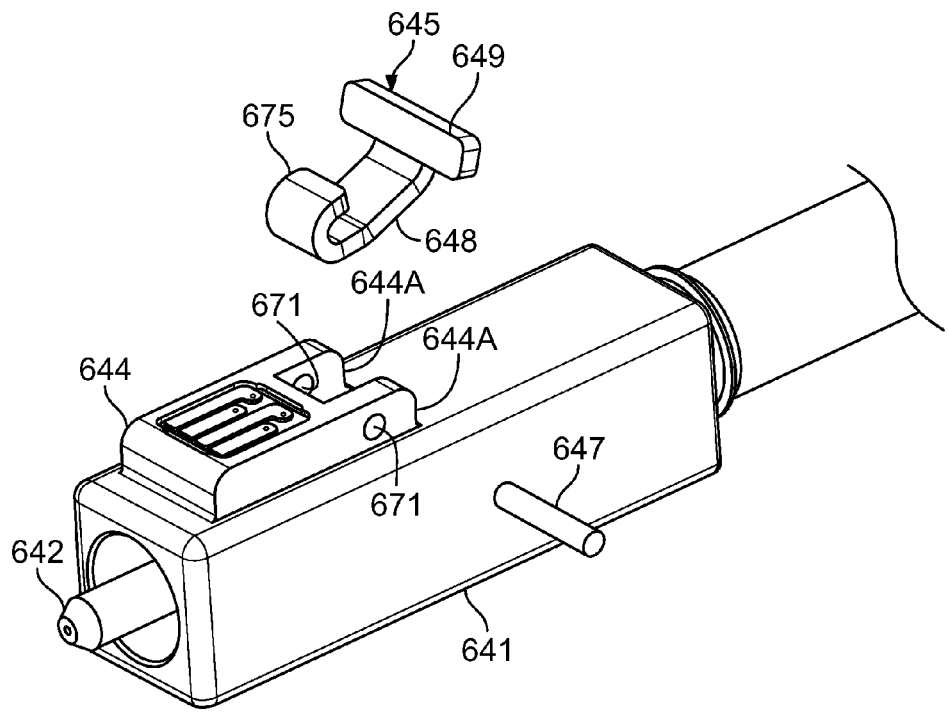
FIG. 30 is a front perspective view of a connector body with another example implementation of a latching member exploded outwardly from the connector body.
Figure 31:
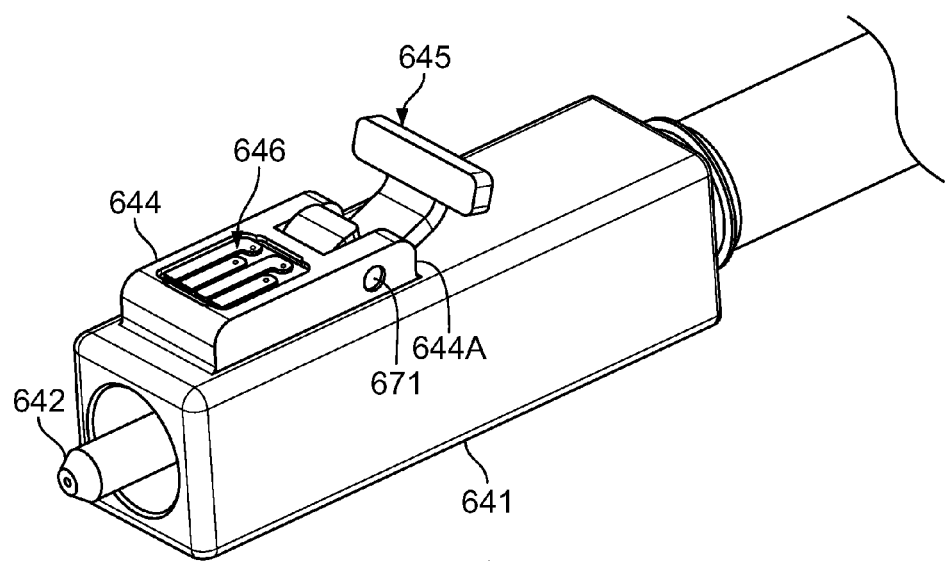
FIG. 31 shows the latching member of FIG. 30 assembled on the connector body.

FIGS. 28 and 29 show the connector body 621 on a connector 600 that has been inserted in a port of an example adapter housing 651. The adapter housing 651 is substantially the same as adapter housing 351 of FIGS. 13-15, except that the orientation of the adapter housing 651 has been flipped and an indicator (e.g., indicator 368) is not shown. However, it should be understood that the adapter housing 651 may be equipped with an indicator (e.g., an LED) as shown in FIGS. 13-15.

The adapter housing 651 includes an abutment surface 654 that faces an interior of the adapter housing 651. The abutment surface 654 is sized so that the latching member 625 of the connector 600 may freely pass by the abutment surface 654 when the latching member is lowered (see FIG. 28). When the latching member 625 is raised, the distal end of the latching member 625 engages the abutment surfaces 654 of the adapter housing 651 (see FIG. 29). A magnet arrangement 665 is coupled to the adapter housing 651 to interact with the latching member 625 of the connector 600. The magnet arrangement 665 is substantially the same as the magnet arrangement 365 of FIGS. 13-15, except that the magnet arrangement 365 aligns with the edge 629B of the handle 629 (instead of the major surface 629A) when the latching member 625 is in the raised position (see FIG. 29).

FIGS. 30-33 illustrate another alternative implementation of a connector body 641 having a latching member 645 that pivots between a raised position and a lowered position. The connector body 641 holds a ferrule 642 and defines a key region 644. Support mounts 644A extend rearwardly from the key region 644 and define laterally aligned openings 671 for receiving a pivot pin 647 that extends between the openings 671. In certain implementations, the pin 647 is rotationally fixed (e.g., welded, glued, etc.) to the support mounts 644A. In other implementations, the pin 647 is rotatable (e.g., snap-fit) within the openings 671.

The latching member 645 includes an arm 648 extending from a handle 649 to a pin-receiving portion 675. The pin-receiving portion 675 is shaped to wrap or fold partially around the pivot pin 647. The pin-receiving portion 675 is substantially the same as pin-receiving portion 635 of FIG. 26, except that the pin-receiving portion 675 curves upwardly and away from the connector body 641 and back towards the handle 649 whereas the pin-receiving portion 635 had curved downwardly towards the connector body 621.

Figure 32:
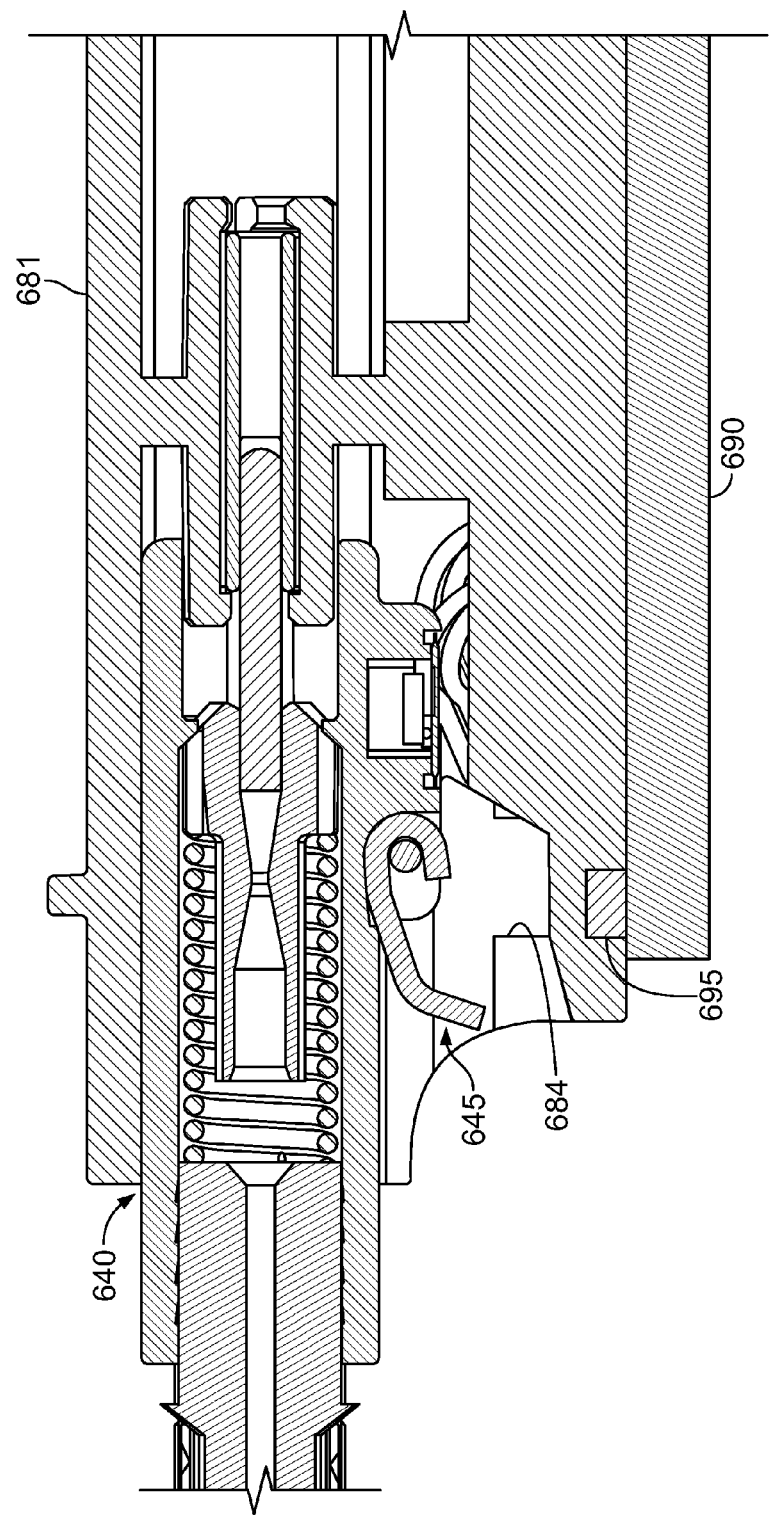
FIG. 32 is a cross-sectional view of an adapter at which the connector body and latching member of FIG. 31 is inserted with the latching member disposed in the lowered position.
Figure 33:
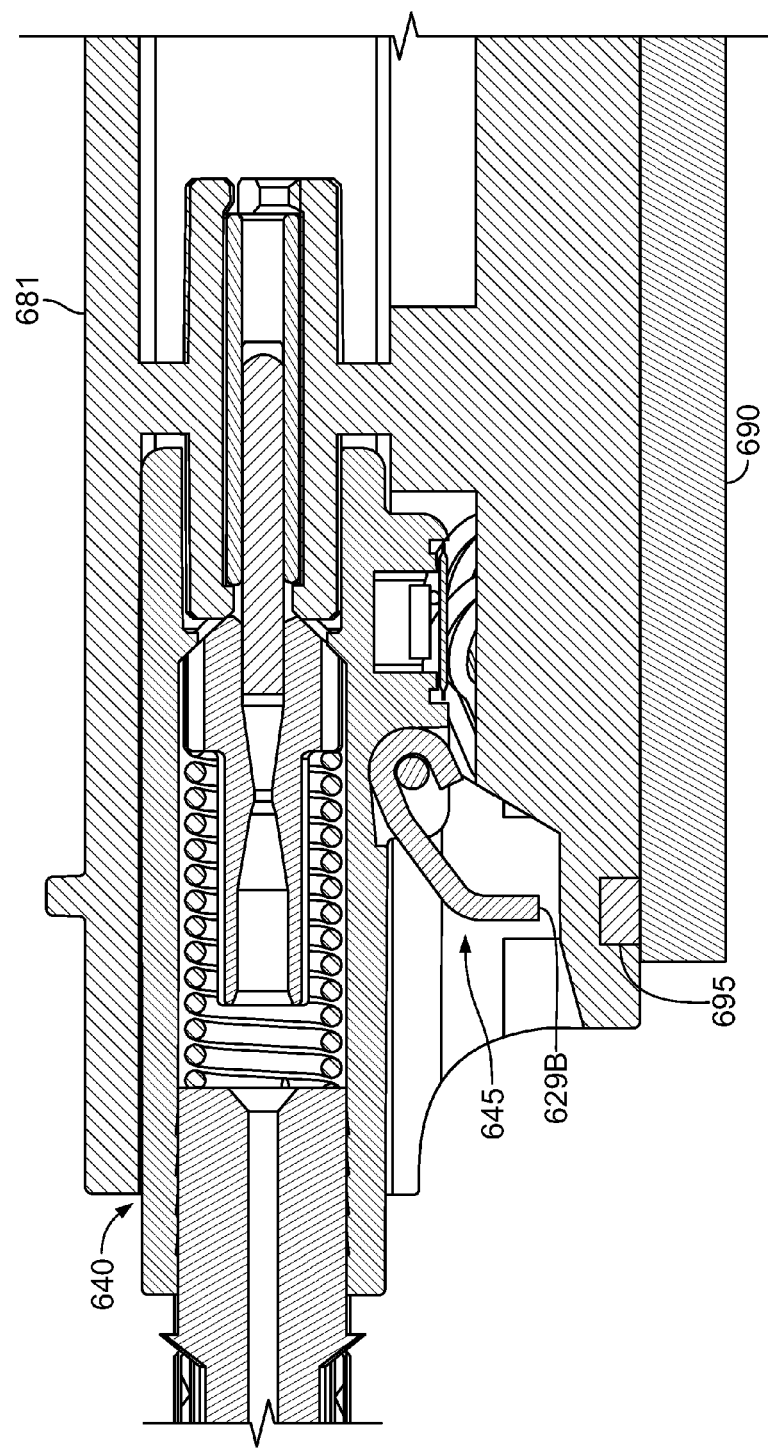
FIG. 33 shows the adapter and connector of FIG. 32 with the latching member disposed in the raised position.

FIGS. 32 and 33 show the connector body 641 on a connector 640 that has been inserted in a port of an example adapter housing 681. The adapter housing 681 is substantially the same as adapter housings 351, 651 described above, except that the connector 640 is shown inserted into the left port instead of the right port. Of course, connectors can be received at both ports. Also, it should be understood that the adapter housing 651 may be equipped with an indicator (e.g., an LED) as shown in FIGS. 13-15.

A magnet arrangement 695, which is substantially the same as magnet arrangement 665 and 365 disclosed herein, is mounted in the adapter 681 and is coupled to a circuit board 690 to actuate the latching member 645 of the connector 640 to releasably lock the connector 640 to the adapter 681. The shape of the latching member 645 allows the arm 648 to pivot within the adapter port while remaining clear of any obstacles. For example, the arm 648 of the latching member 645 stays farther away from the adapter body 681 than the arm 628 of latching member 625 (compare FIG. 33 with FIG. 29).

Referring now to FIG. 16, one or more adapters 350 may be coupled together to form communications equipment 370 (e.g., a blade, a panel, etc.). In some implementations, each adapter 350 of the equipment 370 includes an indicator 368 (e.g., an LED) with which the user's attention may be drawn to a particular adapter on the equipment 370. In other implementations, the equipment 370 may include a display screen on which port identification (e.g., labels) may be listed. In still other implementations, the communications equipment 370 may be configured to otherwise identify a selected one of the adapters 350.

In general, the magnet arrangement 365 and indicator 368 are controlled by a management system 380. For example, the management system 380 determines when the electromagnet 367 is activated, activated with reverse polarization, and deactivated. Accordingly, the management system determines when the connector 300 is secured to the adapter 350 and when the connector 300 is releasable from the adapter 350. The management system 380 also determines when the indicator 368 for each adapter 350 is activated (e.g., lit) and deactivated.

In some implementations, the management system 380 includes a local processor coupled to the adapter 350 or equipment including the adapter. In other implementations, the management system 380 includes a remote processor 382 coupled to the adapter 350 or equipment including the adapter 350. The management system 380 also includes memory 384 that may store processes or operation implemented by the processor 382. The management system 380 also may include a user interface module 386 with which one or more users communicate with the management system 380. Additional details regarding example management systems suitable for use in controlling the magnet arrangement 365 as described in more detail below are disclosed in U.S. Publication No. 2011-0262077-A1, filed Feb. 11, 2011, and titled "Managed Fiber Connectivity Systems," the disclosures of which are hereby incorporated herein by reference.

In general, when a connector 300 is inserted into an adapter port 352, the management system 380 determines whether to authorize the insertion. If the insertion is authorized, then the connector 300 is latched in the adapter port 352. If the insertion is not authorized, then the connector 300 is not latched within the port 352. In some implementations, authorization is granted if the management system 380 expected a connection to be made at the port 352 and the connector 300 matches predetermined criteria.

Figure 17:
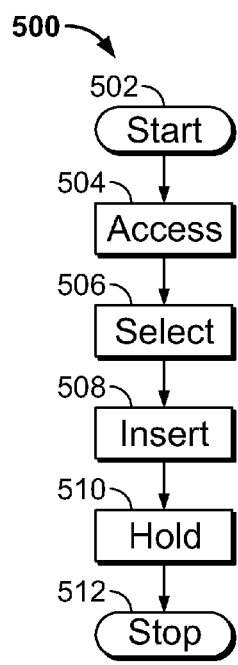
FIG. 17 is a flowchart illustrating an insertion process by which a user may securely plug a connector into an optical adapter.

FIG. 17 is a flowchart illustrating an operational flow for an example insertion process 500 by which a user may plug a fiber optic connector 300 into an adapter 350. The process steps may be implemented by one or more users. In certain implementations, the process steps herein described may occur at different times and/or locations. The insertion process 500 begins at a start module 502 and proceeds to an access operation 504.

During the access operation 504, the user communicates with the management system 380. In some implementations, the user may communicate with the management system 380 via a direct connection to the user interface module 386. In other implementations, the user may communicate with the management system 380 via a networked computer or handheld processing device (e.g., smart phone, PDA, etc.) that is remotely connected (e.g., via a LAN, a WAN, the Internet, or another network) to the management system 380.

During a select operation 506, the user identifies the adapter port 352 at which the user wants to insert the connector 300. For example, in some implementations, the user may view a port map and identify the port at which the connection should be made. In certain implementations, the port map is graphically displayed and the user selects an area on the graphic display. In other implementations, the user may type or otherwise provide a port identification (e.g., a unique identification number) to the management system 380.

In some implementations, the user also may provide the management system 380 with identifying characteristics of the connector 300 to be inserted. For example, the user may provide a unique identification number associated with the connector 300. In other implementations, the user may provide a cable type, connector type, or other physical feature associated with the connector 300. In still other implementations, the user may indicate that the connector 300 to be received is a managed connector (i.e., a connector 300 that includes memory storing physical layer information thereabout).

At an insert operation 508, the user pushes the connector 300 into an adapter port 352. The user holds the connector 300 in the adapter port 350 (see hold operation 510) until the management system 380 indicates that an action has been taken. In some implementations, the action includes latching the connector 300 into the adapter port 352 if the management system 380 determines that insertion is authorized as disclosed in more detail below. In other implementations, the action includes issuing an alarm or error if the management system 380 determines that insertion is not authorized as disclosed in more detail below.

The insertion operation 500 performs any appropriate completion procedures and ends at a stop module 512.

Figure 18:
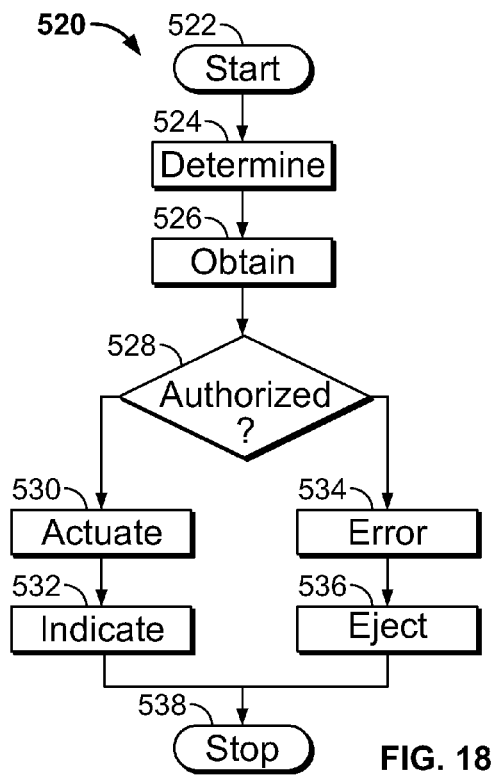
FIG. 18 is a flowchart illustrating an insertion authorization process by which the management system may decide whether or not to latch a connector within an optical adapter.

FIG. 18 is a flowchart illustrating an operational flow for an authorization process 520 by which the management system 380 determines whether or not a connector insertion is appropriate. The process steps may be implemented by one or more processors associated with the management system 380. In certain implementations, the process steps are implemented locally at the adapter 350 or adapter equipment. In other implementations, the process steps are implemented at a location remote from the adapters 350. The insertion authorization process 520 begins at a start module 522 and proceeds to a determine operation 524.

The determine operation 524 determines that a connector 300 has been or is being inserted into one of the adapters 350 associated with the management system 380. For example, the management system 380 may determine that a switch has been opened or closed, thereby indicating that a connector 300 has been inserted into the adapter 350. The determine operation 524 may be implemented during or after insertion of the connector 300 into the adapter 350. In the example adapter 350 shown in FIG. 13, the connector 300 pushes against electrical contacts 362 when inserted, thereby completing a circuit between the contacts 362 and a printed circuit board 360 associated with the adapter 350. In other implementations, however, other types of presence sensors (e.g., pressure sensors, light sensors, etc.) may be utilized.

An obtain operation 526 reads or attempts to read data stored in the memory of the connector 300. If the connector 300 being inserted includes memory 306, then the obtain operation 526 retrieves some or all of the data stored in the memory and sends the data to the management system 380 for processing. In some implementations, the data is sent to a local processor at the adapter equipment. In other implementations, the data is sent to a remote processor. In some implementations, the obtain operation 526 retrieves a unique identifier associated with the connector 300. In other implementations, the obtain operation 526 retrieves physical layer information (e.g., cable type, cable length, connector type, insertion count, security clearance, etc.) pertaining to the connector 300 or cable terminated thereat.

A determination module 528 implemented by the management system 380 determines whether the insertion of the connector 300 at the adapter port 352 should be allowed. For example, in some implementations, the management system 380 determines whether a unique identifier read from the connector memory 306 matches an expected unique identifier provided by a user prior to the insertion. In other implementations, the management system 380 determines whether other types of data read from the memory 306 matches the expected data (e.g., whether the connector 300 is the expected connector type, whether the connector 300 terminates a cable of the expected cable type, whether the connector 300 is associated with the expected security clearance, etc.).

If the management system 380 determines that authorization should be provided, then the management system 380 temporarily activates (e.g., pulses) the magnet arrangement 365 at an actuate operation 530. For example, the management system 380 may activate the electromagnet 367 to create a magnetic field that is sufficiently strong to pull the latch 305 towards the permanent magnet 363. The management system 380 also activates an indicator 368 associated with the adapter port 352 or adapter equipment at an indicate operation 532. For example, in one implementation, the management system 380 may light an LED or other light source associated with the port 352. Activating the indicator tells the user that the connector 300 has been latched.

Alternatively, if the management system 380 determines that authorization should not be provided, then the management system 380 implements an error operation 534 at which the user is informed that authorization is not granted. In some implementations, the error operation 534 does not light an indicator light (e.g., LED) associated with the port. In other implementations, the error operation 534 activates the indicator light with a warning color (e.g., red) or pattern (e.g., flashing). In certain implementations, the error operation 534 sounds an auditory alarm. In certain implementations, the error operation 534 sends an alert message to the user or to an administrator of the management network or security personnel.

In some implementations, the management system 380 implements an eject operation 536 at which the management system 380 instructs the adapter 350 to physically push or otherwise attempt to force the connector 300 out of the port 352. The ejector 356 applies a pressure to the connector 300 to push the connector 300 sufficiently out of the port 352 to prevent transmission of a signal from or to the connector 300. In certain implementations, the ejector 356 pushes the connector 300 completely outside of the adapter port 352.

For example, FIG. 21 illustrates an adapter 350 including an example ejector 356 disposed within the adapter port 352. The example ejector 356 includes a spring 358 that biases the ejector 356 towards the open end of the port 352. The ejector 356 is shaped and configured to engage part of a connector 300 that has been inserted into the respective adapter port 352 at least when the ejector 356 is actuated. In certain implementations, the ejector 356 is held (e.g., physically, magnetically, etc.) in a retracted position against the bias of the spring 358 until actuated by the management system 380. When actuated, the management system 380 releases the ejector 356 to be freely biased by the spring 358.

The insertion authorization operation 520 performs any appropriate completion procedures and ends at a stop module 538.

In general, a connector 300 may be removed from an adapter port 352 when the management system 380 determines that such a removal is authorized. A user provides a request to the management system 380 that a particular connector 300 be unlatched to facilitate removal of the connector 300 from the port 352. When ready to remove the connector 300, the user signals the management system to unlatch the connector 300. The management system 380 unlatches the requested connector 300.

Figure 19:
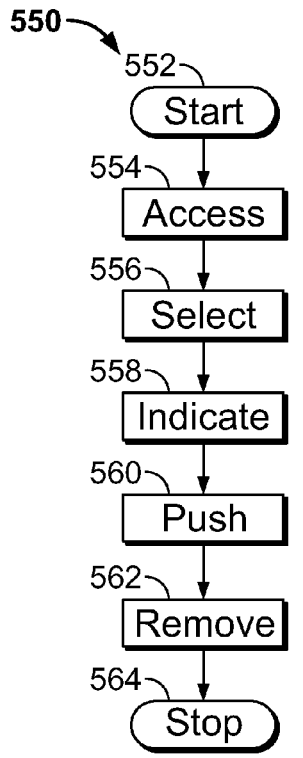
FIG. 19 is a flowchart illustrating a removal process by which a user may remove a connector from an optical adapter.

FIG. 19 is a flowchart illustrating an operational flow for an example removal process 550 by which a user may pull or otherwise remove a fiber optic connector 300 from an adapter port 352. The process steps may be implemented by one or more users. In certain implementations, the process steps herein described may occur at different times and/or locations. The removal process 550 begins at a start module 552 and proceeds to an access operation 554.

During the access operation 554, the user communicates with the management system 380. In some implementations, the user may communicate with the management system 380 via a direct connection to the user interface module 386. In other implementations, the user may communicate with the management system 380 via a networked computer or handheld processing device (e.g., smart phone, PDA, etc.)

that is remotely connected (e.g., via a LAN, a WAN, the Internet, or another network) to the management system 380.

During a select operation 556, the user identifies the adapter port 352 from which the user wants to remove the connector 300 and/or the user identifies the connector 300 that the user wants to remove. For example, in some implementations, the user may view a port map and identify the port at which the disconnection should be made. In certain implementations, the port map is graphically displayed and the user selects an area on the graphic display. In other implementations, the user may type or otherwise provide a port identification (e.g., a unique identification number) and/or a connector identification to the management system 380.

At an indicate operation 558, the user pushes a button or otherwise actuates an input member to provide an indication to the management system 380 that the user is ready to remove a connector. In some implementations, the user pushes a button 375 (FIG. 16) that is associated with multiple adapters 350 on a piece of adapter equipment. In other implementations, the user pushes a button (359) associated with a particular adapter port 352. In some implementations, the user directly depresses the button with a finger of the user. In other implementations, the user indirectly actuates the button as will be described in more detail herein.

In still other implementations, the user indicates readiness using a biometric device (e.g., a fingerprint scanner). In such implementations, the biometric device analyzes biometric data (e.g., a scanned fingerprint) to identify the user. The management system 380 may check whether the identified user is authorized to remove the connector 300 or otherwise modify the connections of the system.

The user pushes the connector 300 forwardly into the adapter port 352 (see push operation 560) until the management system 380 indicates (e.g., via indicator 368) that an action has been taken. By pushing the connector 300 forwardly, the user removes stress on the latch 305. In some implementations, the action includes unlatching the connector 300. In certain implementations, the action may include ejecting the connector 300 from the port 352. In other implementations, the action may include issuing an alarm or error. In some implementations, the user implements the push operation 560 before the indicate operation 558.

In other implementations, the user implements the indicate operation 558 and the push operation 560 at the same time. For example, FIG. 22 illustrates a connector 300 disposed within a port 352 of an adapter 350 having an internal input member 359. In the example shown, the internal input member 359 is a micro-switch that is electrically connected to the circuit board 360 (e.g., via a circuit board 357 or other electrical connecting structure). In such embodiments, pushing the connector 300 into the port 352 actuates the internal input member 359, which triggers the management system 380 to act (e.g., release the latch 305 of the connector 300).

Upon receiving an indication that the action has been taken (e.g., an LED lighting, flashing, changing color, etc.), the user may pull the connector 300 out of the port 352 at a remove operation 362. As noted above, the removal may be assisted by an ejector 356. The removal operation 550 performs any appropriate completion procedures and ends at a stop module 564.

Figure 20:
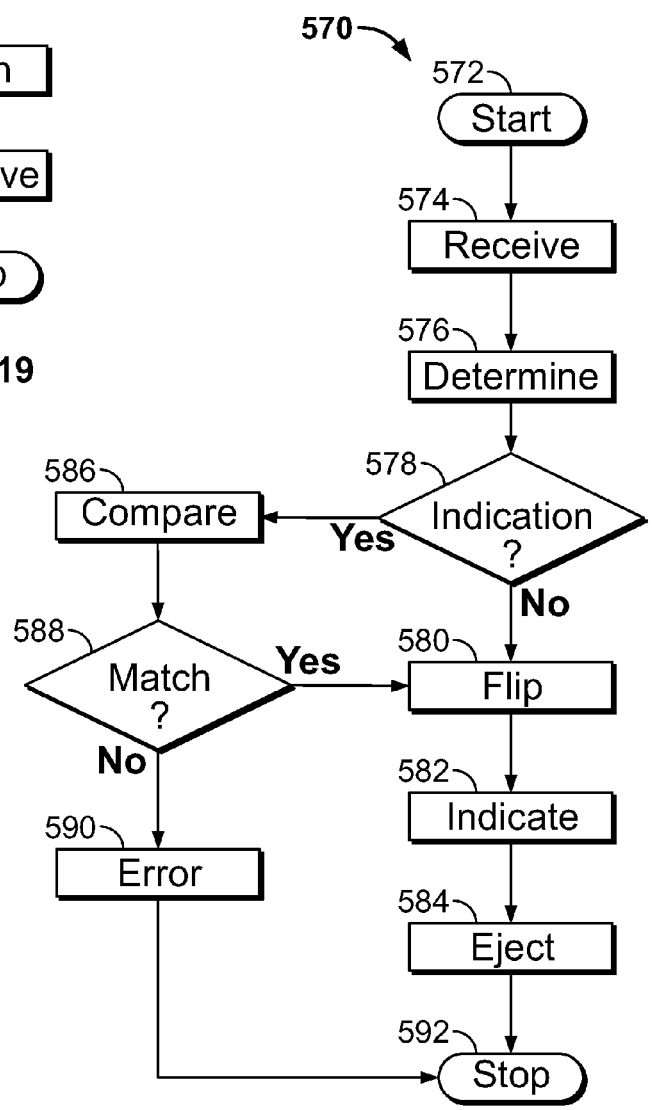
FIG. 20 is a flowchart illustrating a removal authorization process by which the management system may decide whether or not to unlatch a connector within an optical adapter.

FIG. 20 is a flowchart illustrating an operational flow for an authorization process 570 by which the management system 380 determines whether or not removal of a connector from an adapter port is appropriate. The process steps may be implemented by one or more processors associated with the management system 380. In certain implementations, the process steps are implemented locally at the adapter 350 or adapter equipment. In other implementations, the process steps are implemented at a location remote from the adapters 350. The removal authorization process 570 begins at a start module 572 and proceeds to a receive operation 574.

The receive operation 574 obtains a selection of a desired connector 300 to be removed (i.e., or an adapter port 352 from which a connector 300 is desired to be removed). In some implementations, the receive operation 574 obtains a connector selection or port selection from a user via the user interface 386 of the management system 380 (FIG. 16). In certain implementations, the selection is obtained using a graphic interface. In certain implementations, the selection is obtained via a port identification number (or alphanumeric code) or connector identification number (or alphanumeric code). In certain implementations, the receiver operation 574 obtains multiple selections from the user.

After the desired connector 300 or port 352 has been selected, a determine operation 576 receives an indication from a user that the user is ready to disconnect the selected connector 300 (i.e., to disconnect the connector 300 plugged into the selected port 352). For example, the determine operation 576 may receive and process a signal from a push button 359, 375 or other input member actuated manually by the user. In some implementations, the input member 359, 375 is located at the adapter 350 or adapter equipment. In one example implementation, one input member 375 (FIG. 16) is associated with all ports 352 defined by the adapter equipment. In another implementation, each adapter port 352 is associated with its own input member 359 (FIG. 22).

A first determination module 578 determines whether the readiness indication received in the determine operation 576 identifies a particular port 352 from which a connector 300 is to be removed (i.e., or a particular connector 300 to be removed). If the readiness indication does not identify a particular port 352 or connector 300, then the management system 380 implements a flip operation 580 to actuate the electromagnet 367 associated with the port 352 or connector 300 identified in the receive operation 572. However, the management system 380 reverses (i.e., flips) the polarity of the magnetic field generated by the electromagnet 367, thereby repelling the connector latch 305 away from the permanent magnet 363.

During an indicate operation 582, the management system 380 actuates an indicator 368 to denote the connector 300 being unlatched from the port 352. In some implementations, the indicator 368 visually denotes unlatching (e.g., lights an LED, flashes an LED, changes the color of an LED). In other implementations, the indicator 368 audibly denotes unlatching. Optionally, the management system 380 may actuate an ejection member 356 during an eject operation 584 to aid in removing the unlatched connector 300 from the port 352. For example, the management system 380 may release an ejector spring 358 to bias the connector 300 out of the port 352.

However, if the readiness indication of the determine operation 576 does identify a particular port 352 or connector 300, then the management system 380 implements a compare operation 586 that determines whether the user has identified the connector 300 preselected for removal. If the readiness indication identifies the preselected connector 300 or port 352 (see the second determination module 588), then the management system 380 implements the flip operation 580 and proceeds as described above.

If the readiness indication identifies a different connector 300 or port 352 at the second determination module 588, however, then the management system 380 implements an error operation 590. Similarly, if the second determination module 588 determines that no connector 300 or port 352 has been preselected, then the management system 380 will proceed to the error operation 590. The error operation 590 provides an indication to the user that the user is attempting an unauthorized removal of a connector. For example, the error operation 590 may generate or trigger a visual alarm (e.g., a flashing LED), an audible alarm, or some other type of alert. In certain implementations, the error operation 590 will identify (e.g., flash an LED located at) the connector 300 preselected for removal.

The removal authorization operation 570 performs any appropriate completion procedures and ends at a stop module 592.

In some implementations, the management system 380 includes tamper detection sensors (e.g., Hall sensors) disposed at the adapter 350 or adapter equipment to detect when a magnetic field is being applied within the port. The management system 380 may determine whether or not a detected magnetic field is occurring only when the magnet arrangement 365 is actuated. If a magnetic field is detected, but the magnet arrangement 365 is not actuated, then the management system 380 may generate an alert. Such an alert will inhibit a user from forcing an unauthorized connection or removal using an external magnet.

From the foregoing detailed description, it will be evident that modifications and variations can be made in the devices of the disclosure without departing from the spirit or scope of the invention. For example, the above latching techniques and management system can be applied to other types of optical connectors (e.g., MPO connectors, LX.5 connectors, etc.), to electrical connectors (e.g., RJ45 connectors, RJpoint5 connectors, USB connectors, etc.) and sockets, or to hybrid or mixed media connectors and adapters.

The invention claimed is:

1. A plug connector comprising:
a plug body; and
a latching arrangement including a latch arm pivotally coupled to the plug body, the latch arm being pivotal between an engaging position and a non-engaging position, the latching arrangement being positioned to hold the plug body within an adapter port when in the engaging position, the latching arrangement allowing removal of the plug body from the adapter port when in the non-engaging position, the latch arm being configured to be in the non-engaging position absent an external force.

2. The plug connector of claim 1, wherein the plug body holds a ferrule that is configured to terminate at least one optical fiber.

3. The plug connector of claim 1, wherein the plug body holds at least one electrical contact that is configured to terminate an electrical wire.

4. The plug connector of claim 1, wherein the latch arm is formed from a magnetizable material.

5. The plug connector of claim 1, wherein the latch arm has a length that is sufficiently short that the latch arm does not protrude from the adapter port when the plug body is plugged into the adapter port.

6. The plug connector of claim 1, wherein the latch arm extends from a hinge pin that is configured to snap into a recessed channel defined in the plug body, the hinge pin being rotatable within the recessed channel.

7. The plug connector of claim 1, wherein the latch arm is configured to rotate at least partially around a hinge pin that is configured to couple to the plug body.

8. The plug connector of claim 7, wherein the latch arm extends from a hollow tube that is configured to rotatably mount over the hinge pin.

9. The plug connector of claim 7, wherein the latch arm defines a folded region that is configured to rotatably mount over the hinge pin.

10. The plug connector of claim 1, further comprising a storage device coupled to the plug body, the storage device including electronic memory on which physical layer information can be stored.

11. A plug connector comprising:
a plug body having an end face from which an end face of an optical fiber is accessible; and
a latching arrangement including a latch arm extending outwardly from one side of the plug body, the latch arm being configured to move between an engaging position and a non-engaging position, the latch arm being configured to be in the non-engaging position absent an external force, the latching arrangement being configured to latch and release the plug body from an adapter port, the latching arrangement being sufficiently short so that no part of the latching arrangement extends beyond the adapter port when the plug body is inserted within the adapter port.

12. The plug connector of claim 11, wherein the plug body holds a ferrule that is configured to terminate the optical fiber.

13. The plug connector of claim 11, wherein the latch arm extends from a hinge pin that is configured to snap into a recessed channel defined in the plug body, the hinge pin being rotatable within the recessed channel.

14. The plug connector of claim 11, wherein the latch arm is configured to rotate at least partially around a hinge pin that is configured to couple to the plug body.

15. The plug connector of claim 14, wherein the latch arm extends from a hollow tube that is configured to rotatably mount over the hinge pin.

16. The plug connector of claim 14, wherein the latch arm defines a folded region that is configured to rotatably mount over the hinge pin.

17. The plug connector of claim 11, further comprising a storage device coupled to the plug body, the storage device including electronic memory on which physical layer information can be stored.

18. The plug connector of claim 11, wherein the latch arm is formed from a magnetizable material.

19. The plug connector of claim 11, wherein the plug body includes a support structure that maintains the latch arm at a first distance away from the plug body when the latch arm is in the non-engaging position.

* * * * *